July 24, 1951

W. D. BOYNTON 2,561,725

COILING FILAMENTARY ARTICLE

Filed March 9, 1949

INVENTOR
W. D. BOYNTON
BY
ATTORNEY

INVENTOR
W. D. BOYNTON
BY
ATTORNEY

July 24, 1951  W. D. BOYNTON  2,561,725
COILING FILAMENTARY ARTICLE
Filed March 9, 1949  8 Sheets-Sheet 3
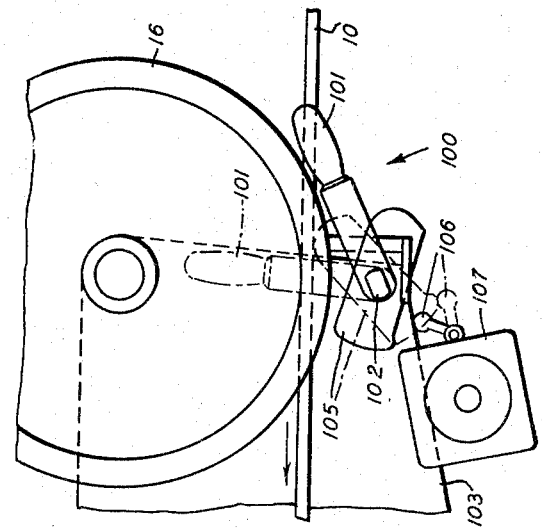
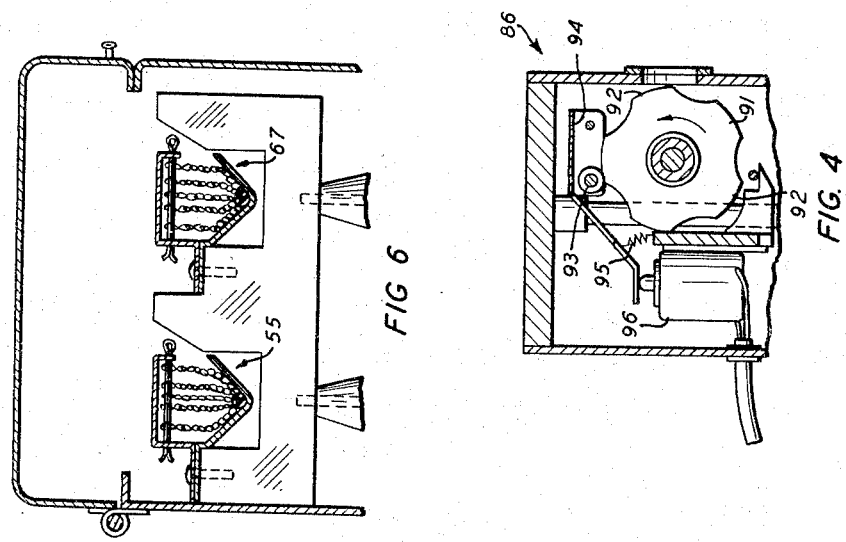
INVENTOR
W. D. BOYNTON
BY
ATTORNEY July 24, 1951 W. D. BOYNTON 2,561,725
COILING FILAMENTARY ARTICLE
Filed March 9, 1949 8 Sheets-Sheet 5

INVENTOR
W. D. BOYNTON
BY
ATTORNEY

July 24, 1951  W. D. BOYNTON  2,561,725
COILING FILAMENTARY ARTICLE
Filed March 9, 1949  8 Sheets-Sheet 6

INVENTOR
W. D. BOYNTON
BY [signature]
ATTORNEY

July 24, 1951  W. D. BOYNTON  2,561,725
COILING FILAMENTARY ARTICLE
Filed March 9, 1949  8 Sheets-Sheet 8

INVENTOR
W. D. BOYNTON
BY
ATTORNEY

Patented July 24, 1951

2,561,725

UNITED STATES PATENT OFFICE 2,561,725

COILING FILAMENTARY ARTICLES

Wentworth D. Boynton, Baltimore, Md., assignor to Western Electric Company, Incorporated, New York, N. Y., a corporation of New York Application March 9, 1949, Serial No. 80,476

25 Claims. (Cl. 242—25)

This invention relates to coiling filamentary articles, and more particularly to methods of and apparatus for electrically testing, metering and coiling filamentary articles.

In general, filamentary electrical conductors are manufactured by means of a substantially continuous process in which the metallic core of the conductor is advanced continuously from a supply thereof through a series of treating apparatus and processes to produce a finished conductor which then is taken up into coils each having a predetermined length of the conductor. When the supply thereof is exhausted, the end of a like filamentary core from another supply is connected to the trailing end of the exhausted supply in order to maintain a continuous supply of conductor to the treating and coiling apparatus. It has been the practice in manufacturing electrical conductors to pass the completed conductor through suitable electrical testing apparatus adapted to detect and indicate the presence of such connections and other defects in the conductor insulation which provide paths of reduced dielectric strength therein so that such coils may be rewound and cut to remove the connection or defects. This procedure often produces coils which contain less than the minimum length of conductor allowed per coil, in which case, such coils result in substantial waste of the conductor. The present invention contemplates coiling up the conductor in such a manner that when a coil in process contains a connection or defect in the insulation of the conductor, an additional length of the conductor is coiled thereon so that when the coil is cut to remove the connection or defect, the resulting coils will contain at least the minimum length of conductor allowed per coil.

An object of the invention is to provide new and improved methods of and apparatus for coiling a continuously advancing filamentary core into predetermined lengths.

A method of coiling filamentary materials into predetermined lengths illustrating certain features of the invention, comprises advancing a filamentary material from a supply thereof along a predetermined path of travel, passing the advancing material through means positioned at predetermined spaced points along its path of travel for detecting defects in the material, and coiling up the filamentary material at the end of its path of travel into coils each having a predetermined length of the material if no defects were detected after the coil in process contained a predetermined length of the material or coiling an additional predetermined length of the material on the coil in process if a defect is detected in the material after said predetermined length of the material is coiled up on the said coil in process, whereby when a defective coil is cut to remove the defect each of the resulting coils will contain at least a predetermined length of the material.

An apparatus illustrating certain features of the invention comprises means for continuously advancing a filamentary material along a predetermined path of travel, means spacedly positioned along the path of travel of the material for detecting defects therein, means for coiling up the material at the end of its path of travel, means for selectively terminating the coil in process when it contains a predetermined length of the material if there are no defects within a predetermined portion of the coil or continuing the said coil in process until an additional predetermined minimum length of the material is coiled on the coil in process when a defect is detected within said predetermined portion of the coil in process, whereby when a defective coil is cut to remove the defect the resulting coils will contain at least the predetermined minimum footage of the material required per coil.

Other objects and advantages of the invention will be understood by reference to the following specification and accompanying drawings, in which:

Fig. 1 is a side elevation of a portion of a continuous extruding and vulcanizing apparatus embodying certain features of the invention;

Fig. 2 is a side elevation of a portion of the apparatus shown in Fig. 1, and extending to the left of the apparatus shown in Fig. 1;

Fig. 4 is an enlarged fragmentary, sectional view taken along line 4—4 of Fig. 3;

Fig. 5 is an enlarged elevation of a portion of the apparatus shown in Fig. 1;

Fig. 6 is a fragmentary, sectional view taken along line 6—6 of Fig. 2;

Figure 7:
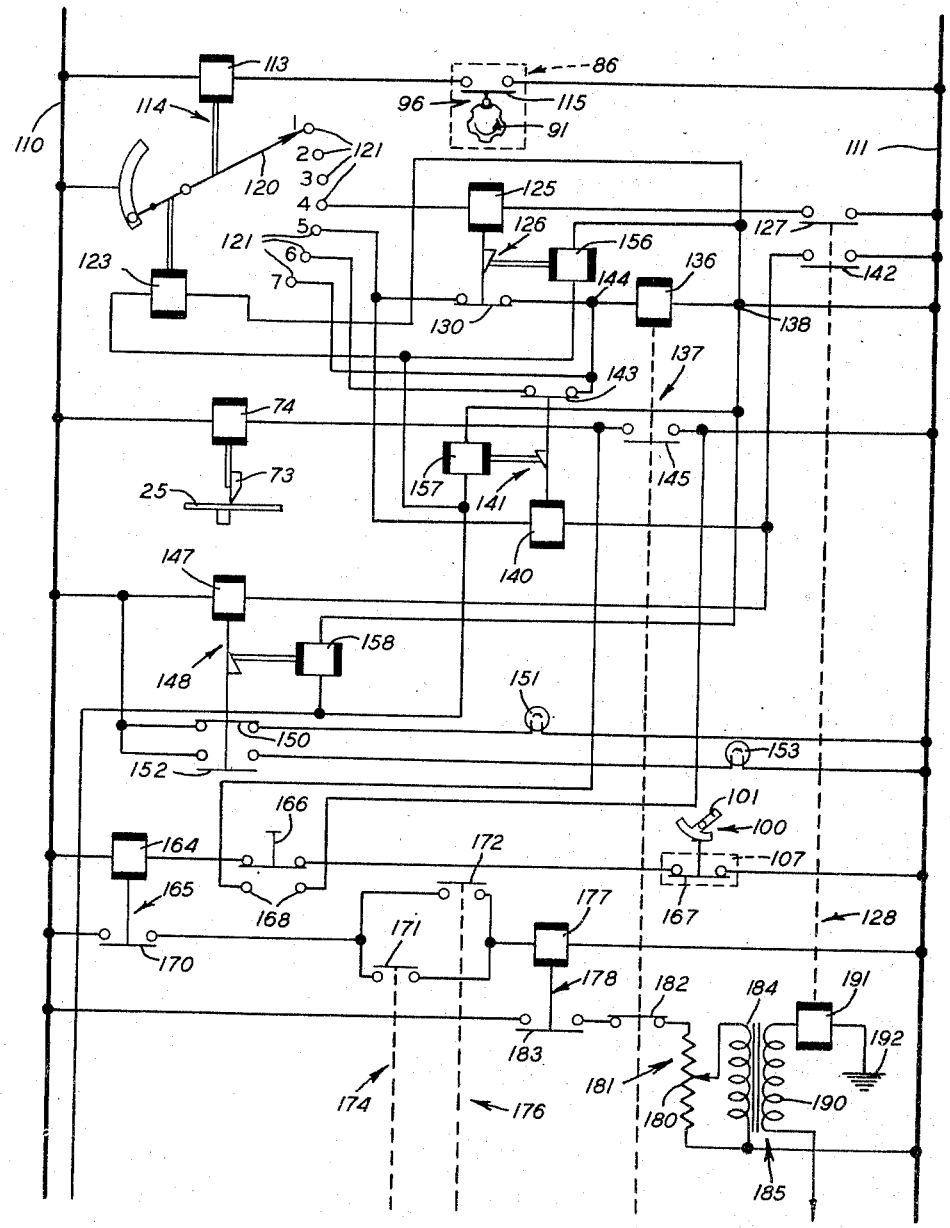
Figure 8:
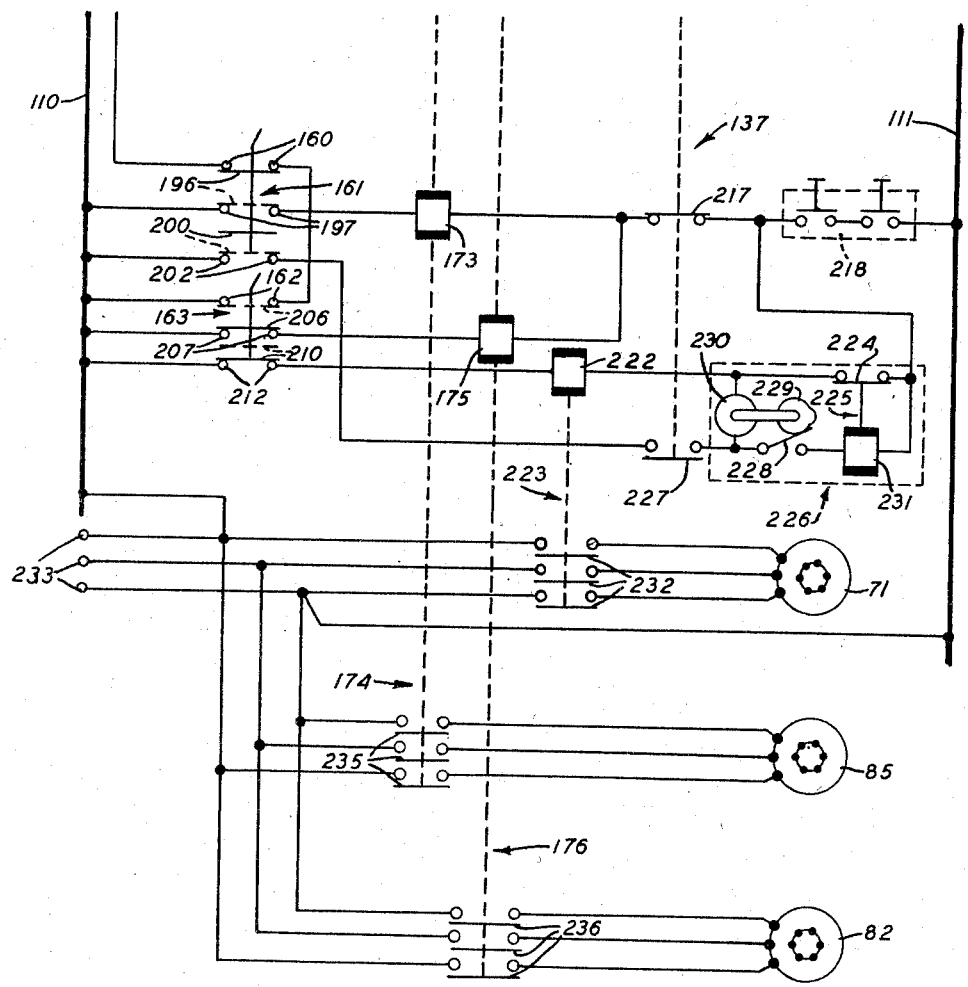
Figure 9:
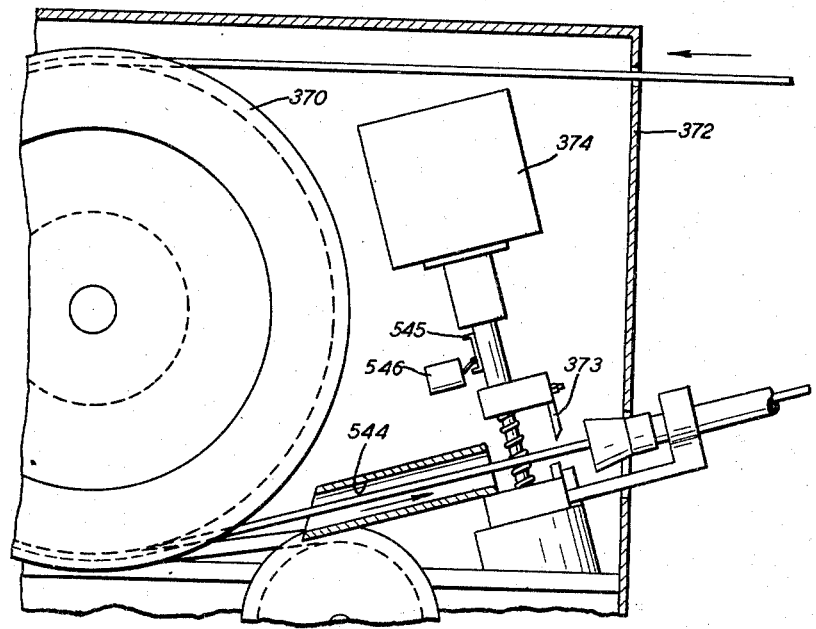
Figure 11:
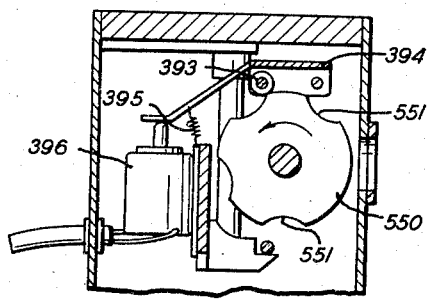
Figure 10:
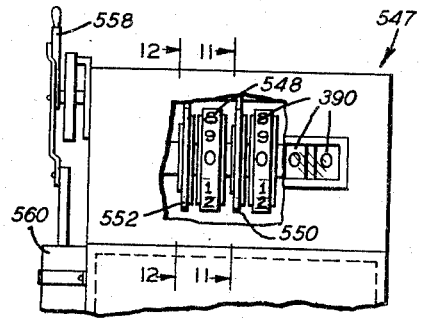
Figure 12:
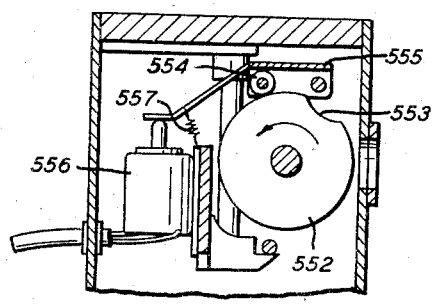
Figure 13:
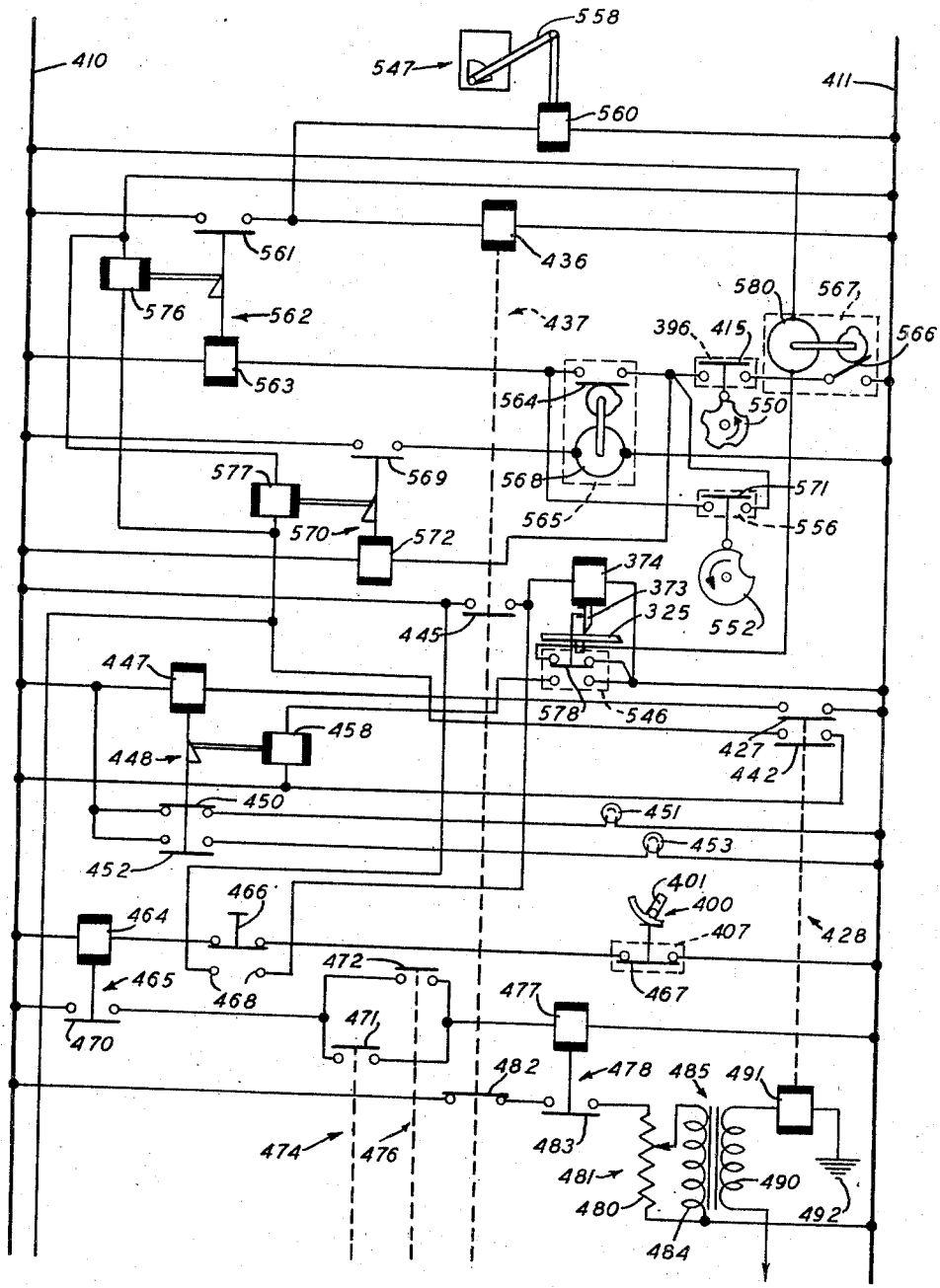
Figure 14:
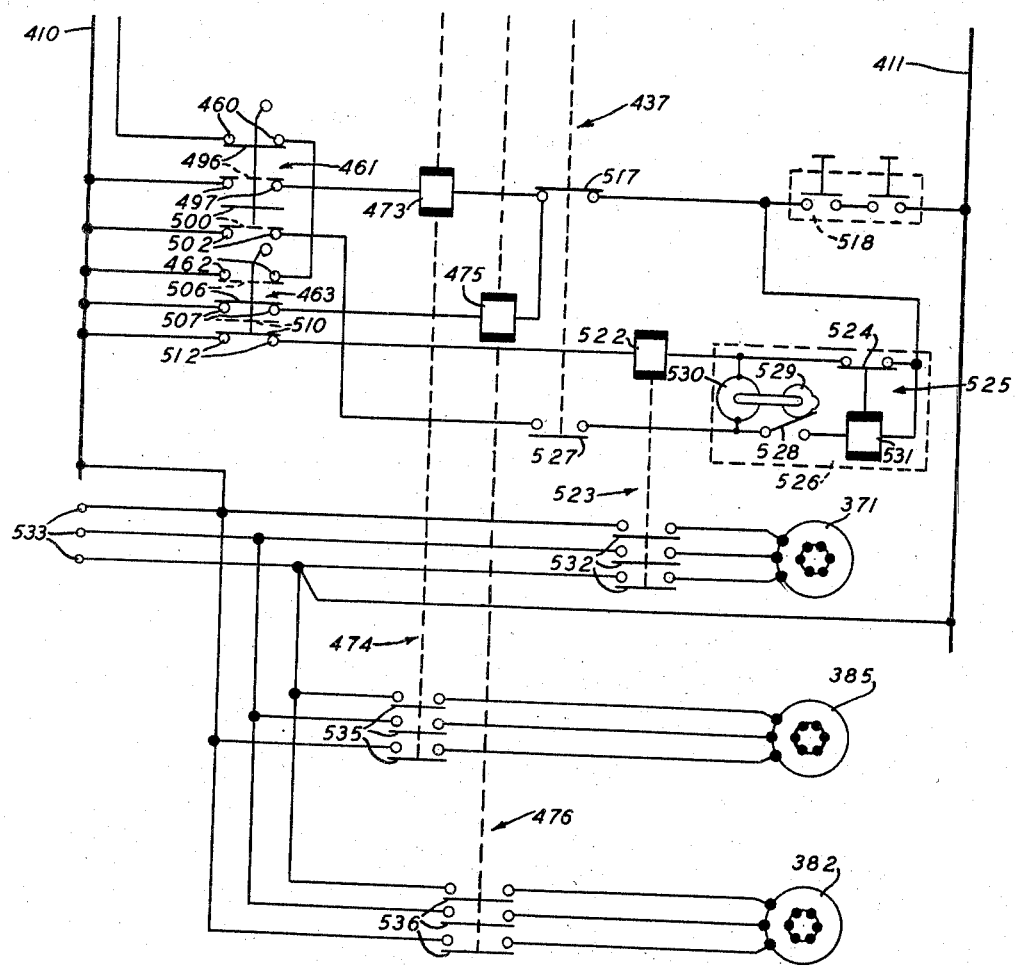

Figs. 7 and 8 combined, constitute a schematic wiring diagram of the electrical system embodied in the pertinent apparatus of the invention;

Fig. 9 is a fragmentary, sectional view of a portion of the apparatus modified in accordance with an alternate embodiment of the invention;

Fig. 10 is a front elevation of a counter modified in accordance with the alternate embodiment of the invention;

Fig. 11 is a vertical, sectional view taken along line 11—11 of Fig. 10 when looking in the direction of the arrows;

Fig. 12 is a vertical, sectional view taken along line 12—12 of Fig. 10 when looking in the direction of the arrows; and Figs. 13 and 14 combined, constitute a schematic wiring diagram of the electrical control circuit and apparatus for the alternate embodiment of the invention.

In the apparatus shown in Figs. 1 and 2, a filamentary core 10, which may be a bare filamentary conductor or an insulated conductor, is wound on a supply reel 11 which is rotatably mounted so that the core 10 may be withdrawn therefrom. The core 10 is withdrawn from the reel 11 by a capstan 12 driven in a counterclockwise direction by a suitable power means (not shown), passes around a guide pulley 14 positioned directly above the reel 11 and then under pulleys 16 and 17, rotatably mounted on the support positioned adjacent to the base of a cutover tower 18. The core 10 also passes over a pulley 20 which is positioned intermediate the pulleys 16 and 17 and connected to an endless chain belt 19 provided with a suitable weight which constantly urges the pulley 20 toward the top of the cutover tower. The pulley 20 normally is latched in its lowermost position on the cutover tower. Suitable braking is applied to the reel 11 so that a predetermined tension is exerted on the core 10 as it is withdrawn from the reel 11.

The core 10, after passing around the capstan 12 several times, advances therefrom through an extruding head 23 forming a part of a conventional screw type extruding apparatus 24 which serves to apply a vulcanizable covering around the advancing core 10 to form an insulated or jacketed conductor 25. The conductor 25 passes from the extruding head through an elongated tube 28 having high pressure, high temperature steam therein for the purpose of vulcanizing the insulating covering as the conductor 25 passes therethrough. The conductor 25 passes from the tube 28 through a cooling apparatus, indicated generally at 30, and thereafter passes around a guide sheave 33 which reverses the direction of travel of the conductor, whereby the conductor now is traveling from left to right in Figs. 1 and 2.

The conductor 25 passes along a V-shaped trough 36 which is partially filled with water, to an air-wiper 37 provided for the purpose of removing the moisture on the insulated covering of the conductor 25. The dry conductor emerging from the air-wiper passes around a capstan 40 driven in a clockwise direction by the same power means provided for the capstan 12 and thereafter travels from right to left around a pulley 43 to a pulley 44 rotatably mounted on a bracket 45 adapted to ride on a T-shaped rail 48. A drum 50 is suitably mounted on the apparatus and is provided with a steel cable wound thereon, a portion of which is withdrawn therefrom and connected to the bracket 44 carrying the pulley 45. The drum 50 is provided with an internal spring mechanism which maintains a constant pull on the bracket 45 so as to continually urge the bracket 45 and the pulley 44 toward the right. The combination of the movable pulley 44 and the spring-biased drum 50 are arranged to form a horizontal expandible loop in the conductor 25 as it travels from the capstan 40 through the remaining portion of the apparatus shown in Fig. 2.

After passing around the pulley 44, the conductor 25 continues moving to the left and passes around a pulley 53 and then upwardly at an angle and around a pulley 54 which guides the conductor through a high voltage electrode 55 mounted in a housing 58. The conductor 25, upon emerging from the electrode 55, passes around the pulley 60, and travels downwardly and around a pulley 61 and then travels to the right to a pulley 62. The conductor 25 passes around the pulley 62, under a pulley 63 which guides a conductor to a pulley 66, which guides the conductor through a second high voltage electrode 67, provided in the housing 58. The conductor 25 travels from the electrode 67 to a capstan 70, mounted in a housing 72 and arranged to be driven by a motor 71. The capstan 70 serves to advance the conductor 25 from the capstan 40 beneath a knife 73 arranged to be actuated by a solenoid 74 and then through a tube 76 which guides the conductor 25 to a pulley 77 rotatably mounted on the end of a traversing shaft 78.

The conductor 25 is shown in Fig. 2 as passing around the pulley 77 and being coiled up by a coiling head 80 rotatably mounted on a support 81 and driven by a motor 82. As the coiling head 80 is rotated to take up the conductor 25, the traversing shaft 78 serves to move the pulley transversely to the rotating axis of the coiling head so as to distribute the conductor evenly on the coiling head. A second coiling head 84 is rotatably mounted on the stand 81 and arranged to be driven by a motor 85.

A counter 86 is arranged to be driven by the motor 71 so as to continuously register the footage of the conductor 25 coiled up by the coiling heads 80 and 84. Dual coiling heads 80 and 84 are provided for the purpose of maintaining a substantially continuous coiling operation of the conductor 25, wherein, as soon as the coiling head in operation has coiled up a predetermined footage of the conductor 25, the conductor is severed by the knife 73 and the end of the conductor emerging from the capstan 70 may be secured to and coiled up by the other coiling head while the previously wound coil is removed from the coiling head. A cover 87 is pivotally mounted on the stand 81 so that it may be selectively positioned to enclose the particular coiling head that is operating to coil up the conductor 25. The movement of the cover from a full coiling head to an empty coiling head is arranged to deenergize the motor driving the full coiling head and energize the motor provided to drive the empty coiling head.

The housing containing the electrodes 55 and 67 is positioned as close to the knife 73 as the apparatus will permit in order to locate the loop in the path of travel of the conductor 25 substantially at the end of its path of travel, that is, the knife 73. The loop formed in the path of travel of the conductor between the first electrode 55 and the second electrode 67 is designed to have a length equal to the minimum length of the conductor 25 required per coil so that the coiling heads can be automatically controlled, in a manner hereinafter to be described, so as to coil up at least the minimum length of conductor on a coil which contains a defect therein, whereby when such a coil is cut to remove the defect the short coil will contain the minimum length of conductor allowed per coil. In the present invention the loop in the path of travel of the conductors between the electrodes is made 200 feet in length, which is the minimum length of the conductor allowed per coil.

Figure 3:
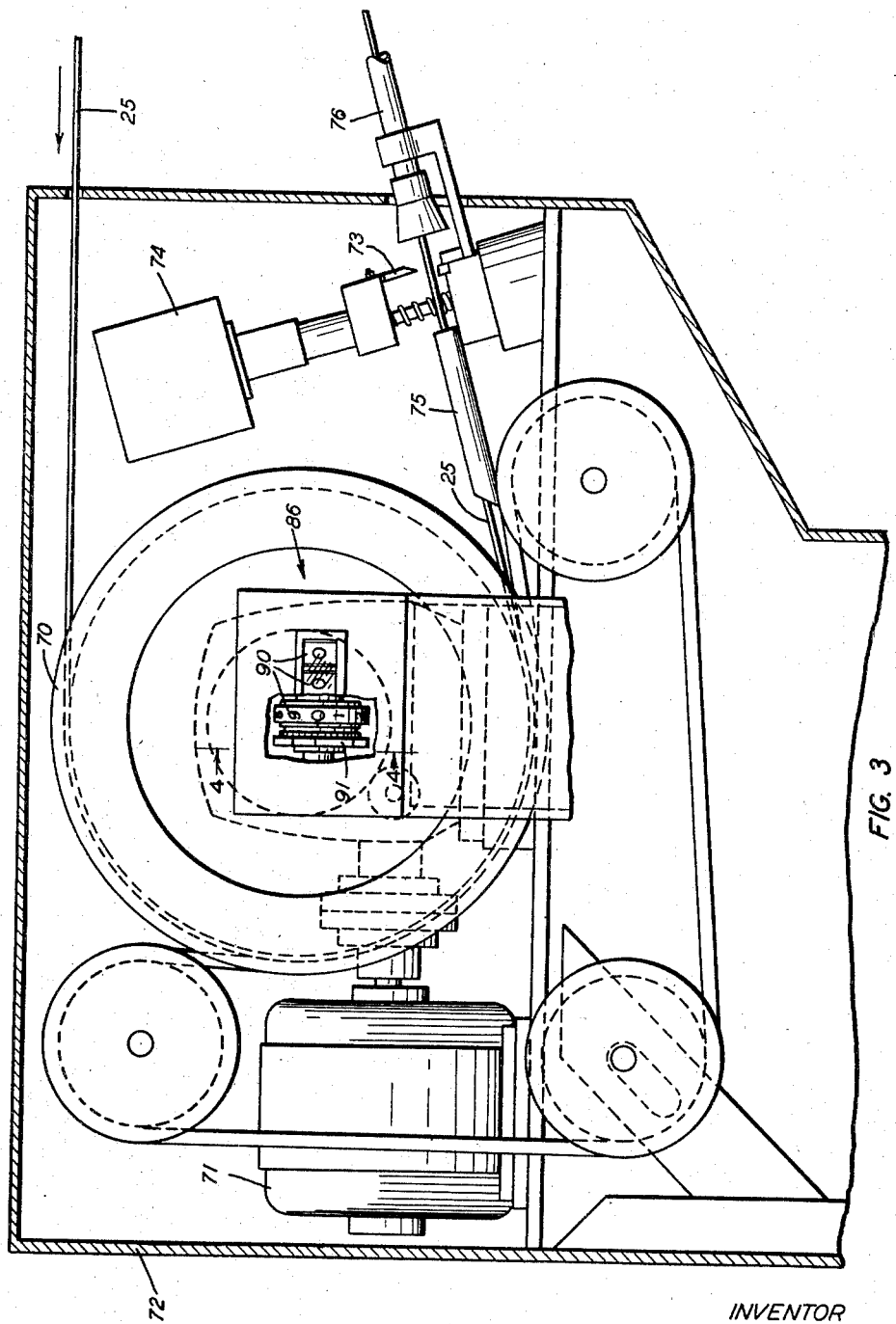
Fig. 3 is an enlarged fragmentary view of a portion of the left end of the apparatus shown in Fig. 2.

The counter 86 (Figs. 3 and 4) is a conventional counter having at least a units, tenths and hundredths wheels 90—90 arranged to be driven so as to record the footage of the conductor 25 being coiled up by the coiling heads by the motor 71. A cam 91 is secured to the hundredths wheel 90 and provided with five equally spaced lobes 92—92 about its periphery, each of which has an arcuate length sufficient to bridge two digits on the hundredths wheel 90. The cam 91 is secured to the hundredths wheel 90 so that each lobe 92 bridges a successive pair of digits consisting of one even digit and one odd digit, so that digits "0" and "1"; "2" and "3"; "4" and "5", and etc. are bridged thereby. A roller 93 mounted on a pivotally mounted arm 94 is urged to ride on the periphery of the cam 91 by a tension spring 95 secured to the free end of the arm 94 and the counter structure. The free end of the arm 94 is arranged to actuate the operating button of a sensitive switch 96 positioned in the counter each time the cam is advanced two digits, that is, each time an even digit is positioned opposite the window of the counter 86.

A second supply reel 98 having a core like the core 10 wound thereon, is also mounted on a rotatable support in order that the core may be withdrawn therefrom. When substantially all of the core 10 is withdrawn from the reel 11, the brake applied to the reel is released so that the weighted pulley 20 of the cutover tower 18 rises to the top of the cutover tower and thereby forms a loop in the path of travel of the core 10 from the reel 11 to the capstan 12. As the end of the core 10 leaves the reel 11, a clamp indicated generally at 100 (Figs. 1 and 5) is actuated to clamp the core 10 tightly in the pulley 16 whereby further advancement of the core 10 is prevented. The end of the core withdrawn from the reel 11 is then spliced to the end of the core wound on the reel 98. During the period of time required to make the switchover from the supply reel 11 to the supply reel 98, the capstan 40 continues to advance the conductor 25 through the extruding and vulcanizing apparatus and in so doing takes up a substantial portion of the loop formed at the cutover tower 18 by the pulley 20. When the splice is completed, the brake 100 is actuated to release the core 10 and permit the capstan 12 to advance the core from the supply reel 98 which thereafter pass through the apparatus in the above-described manner to the coiling heads 80 and 84 positioned at the left end of the apparatus.

The clamp 100 (Fig. 5) provided on the cutover tower 18 consists of a handle 101 secured to a shaft 102 rotatably mounted on a bracket 103 which supports the pulleys 16 and 17. An arm 105 is also secured on the shaft 102 so that when the handle 101 is actuated to its broken line position shown Fig. 5, a portion of the arm 94 engages the core 10 and clamps it tightly against the bottom of the groove of the pulley 16. At the same time, the opposite end of the arm 105 engages an operating lever 106 of a switch 107 and moves the lever 106 to its broken line position. When the lever 106 is in its broken line position it closes a normally open contact provided in the switch 107 which controls a system of electrical apparatus hereinafter to be described, so as to deenergize the high voltage electrodes 55 and 67 provided in the housing 58 while the connection is made between the ends of the cores.

The core 10 is suitably grounded at the supply reels 11 and 98, and at the coiling heads 84 and 85. A high voltage testing circuit is provided in which one side thereof is grounded and the other side thereof connected to the electrodes 55 and 67. As the conductor 25 engages the electrodes 55 and 67, a voltage is impressed across the insulating jacket of the conductor having an intensity sufficient to break down any faults in the insulation, including splices, which provide paths of reduced dielectric strength between the electrodes and the metallic conductor of the core 10. The electric circuit for controlling the operation of the coiling heads 80 and 84 is interlocked with the control circuit of the electrical testing apparatus associated with the electrodes 55 and 67 so that the footage of conductor coiled up on the coiling heads is determined by the presence or absence of faults or splices in the insulating covering of the conductor.

The insulating and coiling apparatus described hereinabove, is automatically controlled by an electrical system shown in Figs. 7 and 8 so that each of the coiling heads 80 and 84 normally will alternately coil up coils having a predetermined footage of the filamentary conductor 25 thereon unless there are defects in the insulation of the conductor 25 within a predetermined distance from the start of a normal coil, in which case, additional footage of the conductor 25 is coiled up by the coiling head in operation so that when the coil is cut to remove the defect, the two coils produced thereby will contain at least the minimum footage required per coil. The electrical system for controlling apparatus shown schematically in Figs. 7 and 8 comprises low voltage busses 110 and 111 from which all the control apparatus receives its operating potential. An operating coil 113 of a step-selector relay 114 is connected across the busses 110 and 111 in series with a normally open contact 115 of the switch 96 provided in the counter 86 and arranged to be actuated by the cam 91. The relay 114 is provided with a pivotally mounted arm 120 arranged to successively engage one of a plurality of contacts 121—121 each time the coil 113 is energized by closure of the contact 115. The opposite end of the arm 120 is connected to the bus 110 and is mechanically connected to a reset coil 123, which when energized serves to return the arm 120 from the lowermost contact 121 to the uppermost contact 121 which is the normal starting position arm. The first three contacts 121—121 of the relay 114 are open-circuited, which means that for two successive closures of the contact 115 by the lobes 92—92 on the cam 91 merely advances the arm 120 of the relay 114 to the third contact 121.

The fourth contact 121 is connected to a coil 125 of the relay 126, the other side of the coil being connected to the bus 111 in series with a contact 127 provided on a fault detector relay 128. The fifth contact 121 of the relay 114 is connected to a normally closed contact 130 provided on the relay 126, the other side of which is connected to one side of a coil 136 of a relay 137. The other side of the coil is connected to a terminal 138 which is connected directly to the bus 111. The fifth contact 121 also is connected directly to one side of a coil 140 of a relay 141, the other side of which coil is connected to the bus 111 in series with a normally open contact 142 provided on the fault detector relay 128. The sixth contact 121 of the relay 114 is connected to one side of a normally closed contact 143 provided on the relay 141, the other side of which is connected to a terminal 144 provided between the contact 130 and the coil 136. The seventh contact 121 is connected directly to the terminal 144 whereby the coil 136 also is connected across the busses 110 and 111 in series with the arm 120 of the switch 114.

The relay 137 is provided with a normally open contact 145 which serves to connect the solenoid 174 which is arranged to actuate the knife 73 across the busses 110 and 111. An operating coil 147 of a relay 148 has one side thereof connected to the bus 110 and the other side thereof connected to the bus 111 in series with the normally open contact 142 of the fault detector relay 128. The relay 148 is provided with a normally closed contact 150 which controls the continuity of a circuit including a lamp 151 provided to indicate when a non-defective coil is wound on the coiling heads 80 and 84 and a normally open contact 152 for controlling the continuity of a circuit including a lamp 153 provided for the purpose of indicating when a faulty coil has been coiled up by one of the coiling heads. The relays 126 and 141 are identical in design and are provided with a conventional latch mechanism arranged to hold their respective normally closed contacts 130 and 143 in the open position after the coils 125 and 140 are being energized to actuate the contacts. The relay 126 is provided with a coil 156 and the relay 141 is provided with a coil 157 which are arranged when energized to actuate their respective latch mechanism and allow the contacts 130 and 143 to resume their normally closed positions.

The relay 148 is also provided with a latch mechanism arranged to latch the normally closed contact 150 in its actuated or open position, and its normally open contact 152 in the closed position when the coil has been energized to actuate its contact. The relay 148 is provided with a coil 158, which when energized actuates the latch mechanism so that the contacts 150 and 152 may be released to their normal operating position. The reset coils 156, 157 and 158 are connected in parallel and one side of the parallel circuit is connected to the bus 111 through the terminal 138 and the other side of the parallel circuit is connected to the bus 110 in series with contacts 160—160 (Fig. 8) of a limit switch 161 and contacts 162—162 of a limit switch 163. A coil 164 of a time delay relay 165 has one side thereof connected to the bus 110, the other side thereof connected to the bus 111 in series with a normally closed push button contact 166 and a normally closed contact 167 provided in the switch 107, arranged to be actuated by the clamp 100 provided on the cutover tower.

The time delay relay 165 is provided with a normally open contact 170 arranged to have a predetermined time delay in closing and has one side thereof connected to the bus 110 and the other side thereof connected to one side of a parallel circuit including a pair of normally open contacts 171 and 172. The contact 171 is arranged to be actuated by a coil 173 of a relay indicated generally at 174 and the contact 172 is arranged to be actuated by a coil 175 of a relay indicated generally at 176. The opposite side of the parallel circuit including the contacts 171 and 172 is connected to one side of the coil 177 of a relay 178, the other side of which coil is connected directly to the bus 111. A winding 180 of a voltage regulator 181 has one terminal thereof connected directly to the bus 111 and the other terminal thereof connected to the bus 110 in series with a normally closed contact 182 provided on the relay 137 and a normally open contact 183 provided on the relay 178.

A primary winding 184 of a step-up transformer 185 is connected across the output terminals of the voltage regulator 181. A secondary winding 190 of the transformer 185 has one terminal thereof connected to an apparatus coil 191 of a fault detector relay 128, the other side of which coil is connected directly to ground indicated generally at 192. The other terminal of the winding 190, of the transformer 185 is connected to the electrodes 55 and 67 provided in the housing 58. Since the metal conductor of the core 10 is grounded at the supply and takeup positions and one side of the winding 190 is connected to ground at 192, the transformer 185 serves to apply a potential across the insulating covering of the conductor 25 sufficient to break down the faults including splices which provide a path of reduced dielectric strength in the insulation and cause current to flow through the secondary winding of the transformer. When such a current flows through the secondary winding of the transformer the coil 191 of the relay 128 is energized and closes its contacts 127 and 142.

Limit switches 161 and 163 (Fig. 8) are mounted on the support 81 supporting the coiling heads 80 and 84 so as to be actuated by the cover 87. The limit switch 161 is provided with a contact arm 196 which is arranged to engage the contacts 160—160 or contacts 197—197 and a contact arm 200 arranged to engage contacts 202—202. The limit switch 163 is provided with a contact arm 206 arranged to engage the contacts 162—162 or contacts 207—207 and an arm 210 adapted to engage contacts 212—212. The switches 161 and 163 are shown in their respective operating positions when the cover 87 is positioned over the coiling head 80 (Fig. 2), in which position the arm 196 of the switch 161 bridges the contacts 160—160, and the arms 206 and 210 of the switch 163 engage the contacts 207—207 and 212—212, respectively. When the cover is positioned over the coiling head 84 the contact arms 196, 200, 206 and 210 of the switches 161 and 163, respectively, assume their broken line positions. The switches 161 and 163 are so designed that as the cover 87 passes through its mid-position between the coiling heads 80 and 84, the contact arms 196 and 206 engage the contacts 160—160 and 162—162. This arrangement of the contact arms 196 and 206 connects the other side of the parallel circuit including the reset coils 123, 156, 157 and 158 to the bus 110, whereby the reset coils are connected across the busses 110 and 111 each time the cover 87 passes through its mid-position. By means of this arrangement the latch mechanism of the relays 114, 126, 141 and 148 are actuated to release their respective contacts to their normal operating position each time the cover is moved from one coiling head to the other coiling head.

The left-hand contact 197 is connected to the bus 110 and the right-hand contact 197 is connected to one side of the coil 173, the other side of which coil is connected to the bus 111 in series with a normally closed contact 217 provided on a relay 137 and normally open contacts provided on a push button 218. The right-hand contact 212 is connected to the bus 110 and the left-hand contact 212 is connected to one side of a coil 222 of a relay 223. The other side of the coil is connected to the bus 111 in series with a normally closed contact 224 of a relay 225 included in a motor driven timer indicated generally at 226 and the normally open contacts of the push button 218. The right-hand contact 202 also is connected to the bus 111 in series with a normally open contact 227 provided on the relay 137, a normally open switch 228 arranged to be actuated by a cam 229 driven by a motor 230 included in the timer 226, a coil 231 of the relay 225, and the normally open contacts of the push button 218. The motor 230 of the timer 226 is connected across the busses 110 and 111 in series with either of the contacts 202—202 or 212—212 depending upon the position of the cover 87, the normally open contact 227 of the relay 137, the normally closed contact 224 of the relay 225 and the contacts of the push button 218.

The relay 223 is provided with normally open contacts 232—232 which are arranged to be actuated to their closed position by the coil 222 and thereby connect the motor 71 driving the capstan 70 to terminals 233—233 which may be connected to a suitable source of a three phase A. C. potential. The relay 174 is provided with normally open contact 235—235 which are arranged to be actuated to their closed position upon the energization of the coil 173 and thereby connect the motor 85 driving the coiling head 84 to the terminals 233—233. The relay 176 provided with normally open contacts 236—236 which are arranged to be actuated by the coil 175 to their closed position and thereby connect the motor 82 driving the coiling head 80 to the terminals 233—233.

*Operation*

Let it be assumed that the core 10 has been withdrawn from the reel 11, manually threaded through the extruding and vulcanizing apparatus and secured to the coiling head 84. The apparatus is operated to draw the core 10 through the apparatus to obtain a completely insulated and vulcanizing conductor 25 at the coiling head end of the apparatus. The end of the conductor 25 is secured to the coiling head 80. The normally open contacts of the push button 218 also are actuated to their closed positions and are designed to remain latched in the closed position so that the coiling heads may be automatically controlled by the counter 86 and the cover 87. While the conductor 25 is being secured to the coiling head 80, the cover 87 is positioned so as to enclose the coiling head 84 and the testing electrodes are deenergized. When the conductor is properly secured to the coiling head 80, the cover then is moved to enclose the coiling head 80 whereupon the movement of the cover sets the limit switches 161 and 163 in the position shown in Fig. 8, in which case, the contact arm 206 bridges the contacts 207—207 and connects the coil 175 of the relay 176 across the busses 110 and 111 in series with the normally closed contact 217 and the closed contacts of the push button 218. This energizes the coil 175, which in turn, closes the contacts 236—236 and connects the motor 82 driving the coiling head 80 to the terminals 233—233 whereby the coiling head starts to coil up the conductor 25 being advanced through the extruding head 24 and vulcanizing tube 28 by the capstans 12 and 40.

The contact 210 (Fig. 8) of the limit switch 163 bridges its associated contacts 212—212 and connects the coil 222 across the busses 110 and 111 in series with the normally closed contact 224 of the timer 226 and the contacts of the push button 218. Energization of the coil 222 closes the normally open contacts 232—232 which connect the motor 71 which drives the capstan 70 to the terminals 233—233. This feature provides simultaneous energization of the motors 71 and 82, whereupon the capstan 70 and the coiling head 80 cooperate to advance the insulated conductor 25 from the capstan 40 so that it may be coiled up by the coiling head 80. The combined torque of the capstan 70 and the coiling head 80 is sufficient to overcome the tension of the drum 50, whereupon the pulley 44 carried on the bracket 45 is moved to its left-hand limit on the T-rail 48, in which position it forms only a very short loop in the path of travel of the conductor 25 between the capstan 40 and the capstan 70.

The coil 164 (Fig. 7) of the time delay relay 165 is connected across the busses 110 and 111 in series with the normally closed contact of the push button 166 and the normally closed contact 167 of the switch 107 whereupon its contact 170 is arranged to close a predetermined period of time after the coil 164 is energized. As soon as the relay 176 is energized to start the motor 82, it closes its contact 172 which in turn connects the coil 177 across the busses in series with the closed contact 170 of the time delay relay. Energization of the coil 177 closes the contact 183, which in turn connects the voltage regulator 181 across the busses 110 and 111 in series with the normally closed contact 182. When the voltage regulator 181 is energized, it in turn energizes the transformer 185 which applies a high potential to the electrodes 55 and 67. Hence, the high voltage testing circuit is energized and the electrodes 55 and 67 connected thereto apply a potential across the portion of the insulating cover and the central conductor passing through the electrodes 55 and 67 after the motor 82 is energized to drive the coiling head 80 to coil up the conductor 25.

Let it be assumed for the purpose of illustrating the invention, that it is desirable to have the coiling heads 80 and 84 normally coil up 800 feet of good conductor 25 at each coiling operation thereof. Let it further be assumed that the minimum footage acceptable per coil is 200 feet of good conductor 25. Should a defect or a splice occur in the portion of the insulation of the conductor 25 passing through the second electrode 67 within 200 feet from the end of a normal 800 foot coil, it then is necessary to coil up at least 200 feet more of the conductor or the coil on the coiling head in operation so that when the coil is rewound for the purpose of removing the defect, two coils will be produced from the coil each of which contains at least 200 feet of good conductor.

As the conductor 25 is coiled up by the coiling head 80, the counter 86, which is driven by the motor 71, continually indicates the footage of the conductor 25 being coiled. In order to obtain the operating sequence, the cam 91 provided on the hundredths wheel 90 of the counter 86 is arranged to actuate the sensitive switch 96 and close its normally open contact 115 each time 200 feet of the conductor 25 has been coiled up by the coiling head in operation, which is assumed to be the coiling head 80. The arm 120 of the step selector relay 114 is in engagement with the first contact position 121 when the apparatus is first placed in operation. When 200 feet of conductor has been coiled up on the coiling head 80, the cam 91 closes the contact 115 to energize the operating coil 113 and advance the arm 120 to the second contact position 121 which is open circuited. When 400 feet of conductor have been coiled up on the coiling head 80, the cam 91 again actuates the switch 115 to energize the coil 113 and advance the arm 120 so it engages the third contact 121 which is also open circuited.

When 600 feet of the conductor have been coiled up, the arm 120 is advanced to the fourth contact 121 in which position it connects the fourth contact 121 to the bus 110. With the arm 120 in this position, the coil 125 of the relay 126 is connected across the busses 110 and 111 in series with the arm 120 and the normally open contact 127 of the fault detector relay 128 whose coil 191 is connected in series with the high potential winding 190 of the transformer 185. Since the contact 127 is normally open, the circuit to the coil 125 remains open circuited, and the contact 130 remains in its normally closed position. When 800 feet of conductor have been coiled up by the coiling head 80, the cam 91 again closes the contact 115 and energizes the coil 113 to advance the arm 120 so that it engages the fifth contact 121. If no fault providing a path of reduced dielectric strength in the insulating cover of the conductor passes through the second electrode 67 after the arm 120 engages the fourth contact 121, that is, after 600 feet of the conductor has been coiled up, the contact 130 of the relay remains in its normally closed position. Under these conditions, when the arm 120 engages the fifth contact 121, it connects the coil 136 of the relay 137 directly across the busses 110 and 111 in series with the arm 120 and a normally closed contact 130 of the relay 126. The coil 136 is thereby energized and closes its contact 145 which connects the solenoid 74 across the busses 110 and 11, whereupon the cutter blade 73 is actuated to sever the conductor 25.

The arm 120 remains in engagement with the fifth contact 121 and holds the coil 136 across the busses 110 and 111 so that the solenoid operating the knife 73 remains energized after the conductor has been severed thereby. The normally closed contact 182 provided on the relay 137 is opened and thereby deenergizes the voltage regulator 81 and the high voltage transformer 185 connected to the electrodes 55 and 67 when the knife blade 73 is actuated by the solenoid 74. At the same time that the contact 182 is opened the contact 217, also provided on the relay 137, is opened, whereupon the coil 175 is disconnected from the busses 110 and 111 and deenergized. The deenergization of the coil 175 allows the contacts 236—236 to drop open and disconnect the motor 82 driving the coiling head 80 to the terminals 233—233 and the coiling head 80 comes to a stop.

Since the conductor 25 has been severed by the knife 73, and the motor 82 disconnected from the terminals 233—233 upon the operation of the relay 137, the capstan 70 driven by the motor 71 continues to advance the conductor 25 from the capstan 40 at a decreased linear speed with respect to the linear speed of the conductor leaving the capstan 40. The difference between the linear speed of the conductor 25 at the capstan 40 and at the capstan 70 is taken up by the pulley 44 which moves to the right due to the tension exerted on the pulley 44 by the spring-biased drum 50 and thereby expands the loop in the path of travel of the conductor. The capstan 70 driven by the motor 71 continues to advance the conductor 25 through the tube 76 so that the end of the severed conductor may be secured to the empty coiling head 84.

At the same time the relay 137 (Figs. 7 and 8) opens the normally closed contact 217 to deenergize the motor 82 as described, the normally open contact 227 is closed. Closure of the contact 227 connects the motor 230 of the timer 226 across the busses 110 and 111 in series with the contact 224 of the relay 225 and the contacts of the push button 218. After the motor 230 has operated for a predetermined timing cycle the cam 229 driven thereby closes the switch 228 which connects the coil 231 across the busses 110 and 111. Energization of the coil 231 opens the normally closed contact 224 and the coil 222 of the relay 223 is deenergized, whereupon the contacts 232—232 drop open and disconnect the motor 71 from the terminals 233—233. Upon the deenergization of the motor the captsan 70 comes to rest and further movement of the conductor 25 at the coiling heads is prevented. Upon the stoppage of the capstan 70, the pulley 44 continues to move to the right and form a substantial loop in the path of travel of the conductor. The timer 226 permits the coil 222 of the relay 223 to remain energized for a sufficient period of time after the coiling head 80 is stopped to allow the motor 71 and the capstan 70 to advance enough of the conductor 25 through the tube 76 so that the end of the conductor may be secured to the coiling head 84.

While the end of the conductor 25 is at rest the operator secures it to a coiling head 84 and then moves the coiling head cover 87 from its left-hand position to its right-hand position (Fig. 2). As the cover 87 is moved from its left-hand position to its right-hand position to enclose the coiling head 84, it actuates the limit switch 163 so as to move the contact arms 206 and 210 to their broken line position as the cover passes through its mid-position. When the contact 206 bridges the contacts 162—162, it connects all the reset coils across the busses 110 and 111, in which case, each reset coil is energized to actuate its respective latching mechanism. The coil 123 being so energized returns the arm 120 of the relay 114 to its normal starting position where it engages the first contact 121. When the arm 121 is reset to its normal starting position, the coil 136 of the relay 137 is deenergized which allows the contacts 182 and 217 to resume their normally closed positions and the contacts 145 and 22 to resume their normally open positions whereupon the solenoid 74 is deenergized and the cutter blade returns to its position above the conductor 25.

As the cover moves from its mid-position to its extreme right-hand position, it leaves the switch 163 in this position and actuates the limit switch 161 so that the contact arms 196 and 200 are moved to their broken line positions, in which position the contact arm 196 engages contacts 197—197 and the contact arm 200 engages the contacts 202—202. This position of the contact arm 196 opens the circuit for the reset coils and connects the coil 173 of the relay 174 across the busses 110 and 111 in series with the normally closed contact 217 and the closed contacts of the push button 218. The energization of the coil 173 closes the contacts 235—235 which connect the motor 85 to the terminals 233—233, whereupon the motor is energized and drives the coiling head 84 so that it starts to coil up the filamentary conductor 85. The movement of the contact arm 200 of the switch 161 to bridge the contacts 202—202 connects the coil 222 of the relay 223 across the busses 110 and 111 in series with the normally closed contact 224 and the contacts of the push button 218. Energization of the coil 222 closes the contacts 232—232 and connects the motor 71 across the terminals 233—233. The arrangement provides simultaneous energization of the motors 71 and 85 so that the capstan 70 and the coiling head 84 simultaneously advance the conductor 25 from the capstan 40 so that it may be coiled up by the coiling head 84.

As soon as the coiling head 84 is placed in operation, the 800' coil is removed from the coiling head 80 so that it is ready to coil up the conductor 25 upon the completion of an 800' coil on the coiling head 84. The high voltage circuit connected to the electrodes 55 and 67, which was deenergized when the conductor 25 was severed by the knife 73, remains deenergized until the selector relay 114 is reset to its starting position by movement of the cover 87 from the coiling head 80 to enclose the coiling head, which deenergizes the relay 137 and allows the contact 182 to resume its normally closed position. This feature serves to keep the high voltage testing electrodes 55 and 67 deenergized while the end of the conductor 25 is being connected to the coiling head 84.

The coiling heads continue to operate in the manner described hereinabove, and alternately coil up 800' of the conductor 25 so long as the insulation of the conductor 25 does not contain a fault or splice which provides a path of reduced dielectric strength between the outer surface of the covering and the metallic conductor of the core 10. The lamp 151, which is connected across the busses 110 and 111 in series with the normally closed contact 150 of the relay 148 remains radiant during this operation of the coiling heads 80 and 84 to indicate that the coils wound on the coiling head contain 800' of good conductor.

To maintain continuous operation of the coiling heads 80 and 84 so as to continuously produce 800' coils thereat, it is necessary to keep a continuous supply of the core 10 and conductor 25 passing through the apparatus. The supply reels 11 and 90 are maintained at the extruding end of the apparatus to provide a continuous supply of the core 10. Let it be assumed that the conductor 25 is being coiled up in the manner described, and that the core 10 is being withdrawn from the reel 11. When substantially all of the core 10 has been withdrawn from the reel 11, the operator of the apparatus reduces the braking applied to the reel 11, whereupon the reduced tension in the core 10 between the reel and the capstan 12 permits the weighted pulley 20 of the cutover tower 18 to rise gradually to the top of the cutover tower. When the end of the core 10 leaves the reel 11, the handle 101 of the clamp 100 (Fig. 4) is actuated to its vertical position, whereupon the arm 105 clamps the conductor 25 against the bottom of the groove of the pulley 16 and prevents further movement of the trailing end of the core 10. This movement of the arm 105 also actuates the lever 106 of the switch 107 and opens the normally closed contact 167 (Fig. 7) of the switch 107 which disconnects the coil 164 of the relay 165 from the busses 110 and 111. Deenergization of the coil 164 allows the contact 170 to drop open and thereby disconnect the coil 177 of the relay 178 from the busses 110 and 111 which allows the contact 183 to open and deenergize the voltage regulator 181 which supplies the desired potential to the transformer 185, whereupon the high voltage testing circuit connected to the electrodes is deenergized. While the trailing end is stopped by the clamp 110, the capstan 12 continues to advance the core 10 from the loop formed in its path of travel by the pulley 20, in which case, the pulley 20 is gradually drawn towards its lowermost position while the coiling head 80 continues to coil up the conductor 25. Immediately after the handle 101 of the clamp 100 is actuated, the trailing end of the core 10 withdrawn from the reel 11 is spliced to the leading end of the core wound on the reel 98. While the operator is handling the end of the core 10, the testing electrodes 55 and 67 are deenergized, in which case, the portion of the conductor advancing through the electrode 55 after the handle 101 was operated is not subjected to the high potential.

However, the conductor 25, after passing through the electrode 55 which is deenergized due to the fact that the splicing operation is being carried on, makes a loop around the pulleys 60, 61, 62, 63 and 66 and then enters the electrode 67. By the time the portions of the conductor which passed the electrode 55 untested reaches the electrode 67, the connection between the ends of the cores have been completed and the clamp 100 released to reenergize the testing circuit, whereby this untested portion of the conductor is tested in the electrode 67. When the splice has been completed the handle 101 is actuated to its horizontal position to release the conductor 25 and allow the capstan 12 to withdraw the core from the reel 98. Suitable braking is applied to the reel 98 to create a tension in the core between the capstan 12 and the reel 98 sufficient to cause the pulley 20 to gradually return to its lowermost position. Since the high voltage testing circuit connected to the electrodes has been reenergized, no portion of the conductor 25 can pass the testing electrode 67 without being subjected to a high voltage test. The empty reel 11 is removed from the supports, and a reel having a core like the core 10 wound thereon is positioned in the supports and the leading end thereof prepared to be spliced to the trailing end of the core being withdrawn from the reel 98 when all the core has been withdrawn therefrom.

The outer and inner ends of the core wound on the reels 11 and 98 have a specially prepared splice secured thereon so that the actual splicing operation between the ends of the cores merely involves connecting the complementary portions of the splice together, an operation which can be completed in a relatively short period of time. The portions of the splice applied to the ends of the core is a metal structure and is designed to pass through the extruding head 23 and have an insulating covering applied therearound the same as the covering is applied around the core 10. The splice on the end of the cores is secured to the metallic conductor of the core so that the core may be continuously advanced through the apparatus to the coiling heads 80 and 84. When the splice passes through the electrodes 55 and 67 it provides a path of reduced dielectric strength between the electrodes and the metallic conductor of the core 10, whereupon sufficient current flows in the secondary winding 190 of the transformer 185 to energize the current responsive coil 191 of the relay 128 which closes the contacts 127 and 142. The breakdown of the insulation at the splice causes the energization of the relay 128 only so long as the splice is passing through one of the electrodes, that is, a substantially momentary energization of the relay 128 occurs under these conditions.

In addition to these metallic splice connectors between cores which produce a point of reduced dielectric strength in the insulation of the conductor 25, defects may be present in the insulation such as small metallic particles embedded in the vulcanized cover applied over the core 10 or a void in the insulating cover itself. These types of defects also provide paths of reduced dielectric strength which complete the high potential testing circuit of the transformer 185 to ground at 192 through the core 10 and energize the relay 128. Since the splices between the cores and the defects in the insulation each cause the energization of the relay they will hereinafter be referred to as faults.

Since it is desirable to produce coils containing 800 feet of good conductor, and in any event to produce coils which contain at least 200 feet of good conductor, it is necessary to prevent such faults in the insulation from occurring within 200 feet from the end of a normal 800 foot coil. For example, should a fault occur in the insulation after 650 feet of good conductor has been coiled up by the coiling head and the coils were terminated after 800 feet had been coiled up, such a coil would produce a 650 foot coil and a 150 foot coil, minus the length of conductor removed from the coil in cutting out the fault or splice, as the case may be. Under these conditions, the 150 foot coil must be set aside as waste, since it is required to have a minimum of 200 feet of good conductor in each coil produced by the apparatus for commercial use.

The coiling heads 80 and 84 are controlled by the combined action of the counter 86 and the electrodes 55 and 67 in the following manner to prevent such waste of the conductor 25.

If the insulation of the conductor 25 contains a fault which provides a path of reduced dielectric strength therein, such a fault in passing through the electrodes 55 and 67 closes the testing circuit including the coil 191, the transformer winding 190 and the core 10 to ground at 192. As a result, sufficient current flows in the testing circuit to energize the current coil 191 of the relay 128 and close its normally open contacts 127 and 142. Assuming that the coiling head 80 is coiling up the conductor 25, if the fault in the insulation of the conductor engages either of the electrodes while the arm 120 engages either of the first three contacts 121—121 of the relay 128, it merely energizes the coil 147 of the relay 148, which opens the normally closed contact 150 and closes the normally open contact 152. This deenergizes the lamp 151 while the lamp 153 is energized to indicate that a faulty conductor is in the process of being coiled up.

The operation of the fault detector relay 128 is momentary due to the fact that its coil 191 is energized so long as a fault is passing through the electrodes 55 and 67. However, the relay 148 is provided with a suitable latching mechanism controlled by the reset coil 158 which holds the contacts 150 and 152 in their actuated position after the fault leaves the electrodes 55 and 67. This causes the faulty coil lamp 153 to remain radiant for the remaining portion of the coiling operation, that is, until the knife 73 is automatically operated by the cam 91 to terminate the coil in process when 800 feet of the conductor has been coiled up. If the fault in the insulation of the conductor 25 passes through both of the electrodes before the arm 120 engaged its fourth position contact 121, that is, before 600 feet of the conductor has been coiled up, it is not necessary to add additional footage of the conductor to the 800 foot coil because such a coil can be cut to remove the fault and still leave two coils containing at least 200 feet of good conductor per coil.

If a fault in the insulation of the conductor 25 passes through the first electrode 55 while the arm 120 engages the third contact 121 of the switch 114 and then through the second electrode 67 and energizes the relay 128 while the arm 120 engages the fourth contact 121; that is, after 600 feet of the conductor has been coiled up, the first closure of the contact 127 of the relay 128 energizes the lamp 153 as described above, whereas the second closure of the contact 127 connects the coil 125 of the relay 126 across the busses 110 and 111 in series with the arm 120 of the relay 114 and the contact 127 of the relay 128. Energization of the coil 125 opens the normally closed contact 130, which thereafter is latched in an open position by the latch mechanism provided on the relay 126. When 800 feet of the conductor has been coiled up and the arm 120 is advanced to engage the fifth contact 121, the circuit connecting the coil 136 of the relay 137 across the busses 110 and 111 is open circuited by the latched open contact 130, which open circuit in turn prevents the energization of the relay 137 and actuation of the knife 73 by the solenoid 74 at this point.

If the solenoid 74 were not prevented from operating the knife 73 at this point to sever the conductor, the 800 foot coil on the coiling head would contain a fault somewhere within the last 200 feet of the conductor on the coil, which means that when the fault is removed from such a coil, a coil containing less than 200 feet of good conductor would result. Since such coils are not commercially acceptable under the assumed requirements, this would amount to a substantial waste of the conductor 25. However, the energization of the fault detector relay 128 after 600 feet of the conductor was coiled upon the coiling head in operation prevents the solenoid 74 from actuating the knife 73 when 800 feet has been coiled, in which case, the coiling head in operation continues to coil up the conductor 25. When 1000 feet of the conductor 25 has been coiled up, the arm 120 is advanced to engage the sixth contact 212. If no other fault passes through the electrodes 55 and 67 while the contact arm engaged the fifth contact 121, as soon as the arm engages the sixth contact it connects the coil 136 of the relay 137 across the busses 110 and 111 through the normally closed contact 143 of the relay 141. Energization of the coil 136 closes the normally open contacts 145 and 217 and opens the normally closed contacts 182 and 217. The opening of the contacts 182 and 217 deenergizes the electrodes 55 and 67 and the motor driving the coiling head in operation, respectively, as previously described. The closure of the contacts 145 and 227 shortly thereafter energizes the solenoid 74 which actuates the knife 73 to sever the conductor 25, and energizes the motor 230 of the timer 226 to begin the timing cycle controlling the operation of the motor 71, respectively, as previously described above. Since the fault occurred in the insulation of the conductor 25 in the manner described, the coil on the coiling head contained 1000 feet of the conductor 25 when the conductor was severed and the coiling operation terminated. The coil can be placed on suitable rewinding apparatus for the purpose of cutting the coil to remove the fault from the coil and still leave two coils each of which will contain at least 200 feet of good conductor. Even though the completed coil under these circumstances, contains 1000 feet of the conductor 25, the motor 71 operates in the same manner as when normal 800 foot coils are terminated, that is, while the particular coiling head motor is deenergized, the motor 71 remains energized until the motor 230 of the timer 226 completes its timing cycle and opens the contact 224 which deenergizes the operating coil 222 of the relay 223. This additional period of operation allotted to the motor 71 driving the capstan 70 advances a sufficient length of conductor 25 through the tube 76 in order that the end thereof may be connected to the empty coiling head. After the conductor is connected to the empty coiling head, the cover 87 is moved to close that coiling head which movement operates the switches 161 and 163 in the manner described above and energizes the motor 71 and the motor driving the particular coiling head to be placed in operation.

Now let it be assumed that a fault passes through the first electrode 55 after 600 feet have been coiled up on the coiling head 80. Due to the 200 foot loop between the electrodes 55 and 67, this fault will not pass through the electrode 67 until the coiling head had coiled up more than 800 feet of the conductor, in which case, such a coil cannot be terminated when 1000 feet have been coiled up because the fault in the insulation would be within the last 200 feet of such a coil. Such a result under these conditions is prevented by causing the coiling head 80 to coil up 1200 feet of the conductor in the following manner. When the fault passes through the first electrode with more than 600 feet of the conductor on the coiling head 80, the arm 120 is engaging the fourth contact 121, the energization of the relay 128 by the fault energizes the relay 126 which opens the circuit between the fifth contact 121 and the coil 136 of the relay 137. Hence, when the arm 120 is advanced to engage the fifth contact 121, that is, the 800 foot contact, the solenoid 74 is not energized to actuate the knife 73 and sever the conductor due to the open contact 130, whereby the coiling head 80 continues to coil up the conductor.

When the same fault passes through the second electrode 67, the coiling head has coiled up more than 800 feet of the conductor and the arm 120 now engages the fifth contact 121, in which case, the closure of the contact 142 because of the fault connects the coil 140 of the relay 141 across the busses. Energization of the coil 140 opens the contact 143 which remains latched open and disconnects the coil 136 of the relay 137 from the sixth contact 121 of the selector relay 114. When 1000 feet of the conductor has been coiled up on the coiling head, the arm 120 is advanced to the sixth contact 121, the conductor is not severed to terminate the coil because the open contact 143 prevents energization of the coil 136 of the relay 137. The coiling head continues to coil up the conductor until 1200 feet thereof have been coiled up, whereupon the arm engages the seventh contact 121 and connects the coil 136 directly across the busses. Energization of the coil 136 effects the operation of the knife 73 to sever the conductor and the termination of the coiling operation. The 1200 foot coil may be cut to remove the fault and leave two coils, the smaller of which will contain at least 200 feet of good conductor.

In the case of multiple faults in the conductor 25 the position of the last fault to pass through the electrode 67 with respect to the length of the conductor coiled up at the time of such passage, controls the total footage of the conductor to be coiled up on the coil in process. If all the faults pass through the second electrode 67 before 600 feet of the conductor has been coiled up, the coil in process is terminated when it contains 800 feet of the conductor in the manner described hereinabove for these conditions. If a fault passes through the second electrode 67 before 600 feet of the conductor is coiled up on the coil in process and a second fault passes through the second electrode before 800 feet of the conductor is coiled up on the coil in process, the second fault effects the termination of the coil in process when said coil contains 1000 feet of the conductor in the manner described hereinabove. If both faults pass through the second electrode 67 before 800 feet of the conductor is wound on the coil in process the second fault will effect the termination of the coil in process when 1000 feet of the conductor is coiled up. If a fault passes through the second electrode 67 after 600 feet have been coiled up and a second fault passes through the second electrode after 800 feet of the conductor is coiled up, the second fault will effect the termination of the coil in process when it contains 1200 feet of the conductor 25.

It is essential that the testing apparatus 58, containing the electrodes 55 and 67 be positioned as close to the knife 73 as the apparatus permits in order to obtain the above-described cooperation of the counter 86 and the electrodes 55 and 67 in terminating the coils of the conductor wound on the coiling heads. By virtue of this arrangement, if the 200 foot loop of the conductor between the electrodes makes certain that the last 200 feet of the coil in process is not defective, because a fault in this loop keeps the coiling head in operation until at least 200 feet of good conductor is added to the coil in process after a fault passes through the second electrode. If a fault passes through the electrode 67 after 1000 feet of the conductor is wound on the coil in process, the counter 86 will cause the coil to be terminated when 1200 feet is coiled up because this is the maximum footage the coiling heads 80 and 84 accommodate. The 200 foot loop between the electrodes 55 and 67 permits them to be deenergized while the connection is made between an exhausted supply reel, and full supply reel, and it also permits the counter 86 to "look ahead" of the actual footage of the conductor coiled up at any time during a coiling operation and ascertain if the next succeeding 200 feet of the conductor to be coiled up is not defective, or if it is defective to prevent the coil from being terminated until the last 200 feet of the conductor on the coil is not defective. The above-described arrangement of the coiling heads 80 and 84 prevents them from producing coils containing less than 200 feet of good conductor when it is necessary to remove faults or splices from the coils wound on the coiling heads. Since the coiling heads in operation only coil up 1000 feet or 1200 feet of the conductor 25 when a fault in the insulation of the conductor passes through the electrode 67 after 600 feet or 800 feet, respectively, of the conductor has been coiled up on the coil in process, no coils are produced containing more than 1000 feet of the conductor 25. Such coils are cut to make two separate coils in order to remove the fault which caused the coiling head to coil up more than the normal 800 feet of the conductor.

*Alternate embodiment*

An alternate embodiment of the invention for automatically controlling the coiling heads 80 and 84 shown in Fig. 2 comprises the apparatus shown in Figs. 9, 10, 11 and 12, which is electrically controlled in accordance with the wiring diagrams shown in Figs. 13 and 14. The alternate embodiment of the invention includes the use of the additional apparatus shown in Figs. 9 to 12, inclusive, in conjunction with a substantial portion of the apparatus described in the principal embodiment. The various elements of the principal apparatus which appear in the description of the alternate embodiment bear the same numeral designation raised by the addition of 300 thereto and the additional apparatus not described hereinbefore is designated by numerals of a higher order than those given to the common elements of both embodiments of the invention to prevent confusion with the description of the preferred embodiment of the invention.

The alternate embodiment comprises a switch 546 suitably mounted in the housing 372 so as to be actuated by a U-shaped bracket 545 fastened to the knife 373 so that after the knife has completely severed the conductor 25, the switch 546 is actuated. The switch 546 contains a single pole double throw contact which will be described in connection with the wiring diagram shown in Fig. 13.

A counter 547 (Fig. 10) is mounted on the outside of the housing 372 and is arranged to be driven by the motor 371 to record the footage of the conductor 25 being coiled up by the coiling heads 80 and 84. The counter 547 is similar to the counter 86, having units, tenths and hundredths wheels 390—390 and in addition thereto a thousandths wheel 548 which is driven in a counter-clockwise direction in a conventional manner by the hundredths wheel 390, that is, upon each complete revolution of the hundredths wheel 390, the thousandths wheel 548 is advanced one digit. A cam 550 (Fig. 11) is secured to the hundredths wheel 390 for rotation therewith and is provided with four recesses 551 in the periphery thereof. A roller 393, carried by a pivotally mounted arm 394 is arranged to engage the periphery of the cam 550. The free end of the arm 394 engages the operating button of a sensitive switch 396 mounted in the counter and identical with the switch 96 mounted in the counter 86. A spring 395 serves to urge the arm downwardly so that the roller constantly engages the periphery of the cam 550. The cam 550 is secured on the hundredths wheel 390 so that the recesses 551—551 are positioned between the digits "2" and "3"; "4" and "5"; "6" and "7"; and "8" and "9" marked on the periphery thereof. When the "0" digit is aligned with the window of the counter, the cam 550 assumes the position shown in Fig. 11.

A second cam 552 (Fig. 12) is mounted in the counter 547 for rotation with the thousandths wheel 548 and has a single recess 553 provided in its periphery which is positioned between the digits "8" and "9" marked on the periphery of the thousandths wheel. The counter 547 is also provided with a reset mechanism (not shown) which is arranged to be actuated by a handle 558 (Fig. 10), the actuation of which restores the counting wheels 390—390 and 548 to their normal starting position, that is, with the "0" digit of each wheel positioned directly opposite the window of the counter. A solenoid 560 is mounted on the counter support and suitably connected to the handle 558 so as to operate the handle downwardly when energized. A roller 554 engages the periphery of the cam 552 and is mounted on an arm 555 pivotally mounted in the counter 547 and having the free end thereof adapted to actuate the operating button of a sensitive switch 556 mounted in the counter. A spring 557 is provided for the purpose of urging the pivotally mounted arm 555 downwardly so as to maintain the roller 554 continuously in engagement with the periphery of the cam 552.

The cams 550 and 552 are shown in Figs. 11 and 12, respectively, in their normal starting positions, that is, when the "0" digits of the hundredths and thousandths wheels are aligned directly opposite the window of the counter. The arrangement of the recesses 551—551 on the cam 550 permits the arm to operate the switch 396 momentarily each time the digits "2," "6," "8" and "0" are advanced in a counterclockwise direction when viewed in Fig. 11 to a position directly opposite the window of the counter, in which case, each time 200 feet, 600 feet, 800 feet and 1000 feet of the conductor 25 is coiled up, the switch 396 is actuated.

The recess 553 is arranged on the cam 552 so as to permit the arm 555 to actuate the switch 556 each time the digit "2" of the thousandths wheel is advanced in a counterclockwise direction when viewed in Fig. 12 to a position directly opposite the window of the counter, that is, each time 1200 feet of the conductor 25 has been coiled up. The recess 553 on the cam 552 is aligned with the recess 551 on the cam 550 since they lie between the digits "8" and "9" on their respective counting wheels, but the recess 551 completes actuation of the switch 396 when 200 feet of the conductor is coiled up, whereas the recess 553 permits the operation of the switch 556 when 1200 feet of the conductor is coiled up.

Referring now to Fig. 13, there is shown a schematic wiring diagram of the electrical apparatus forming a part of the alternate embodiment of the invention which is arranged to be energized from busses 410 and 411 which are connected to a suitable source of A. C. potential. The solenoid 560, which is arranged when energized, to actuate the reset lever 558 of the counter 547, is connected across the busses 410 and 411 in series with a normally open contact 561 provided on a relay 562. An operating coil 436 of a relay 437, which is similar to the relay 137 referred to in the preferred embodiment of the invention, is also connected across the busses 410 and 411 in series with the normally open contact 561 of the relay 562. An operating coil 563 of the relay 562 is connected across the busses 410 and 411 in series with a normally open contact 564 provided on a motor driven timer 565, the normally open contact 415 provided on the switch 396 which is arranged to be actuated by the cam 550 provided in the counter 547 and a normally open contact 566 provided in a motor driven timer 567. An operating motor 568 of the timer 565 is connected across the busses 410 and 411 in series with a normally open contact 569 provided on a relay 570. A normally open contact 571 is provided in the switch 556 which is actuated by the cam 552 of the counter 547, is connected across the busses 410 and 411 in series with the operating coil 563 of the relay 562, the normally open contact 415 and the normally open contact 566.

The relay 570 is provided with an operating coil 572, which is connected across the busses 410 and 411 in series with the normally open contact 415 of the switch 396 and the normally open contact 566 of the timer 567. The solenoid 374, which actuates the knife blade 373, is connected across the busses 410 and 411 in series with a contact 445 provided on the relay 437. When the solenoid 374 actuates the knife blade 373, it also actuates the operating lever of the limit switch 546. The switch 546 is provided with a single pole double throw contact arm 578 which is normally positioned to connect the motor 580 of the timer 567 across the busses 410 and 411. When the contact arm 578 is actuated by the knife 373 it disconnects the motor 580 from the busses so that the timer may reset to zero, and connects the reset coil 458 of the relay 448 across the busses 410 and 411. Each of the relays 562 and 570 are provided with a spring-loaded latching mechanism arranged to latch their respective contacts in the position effected by the energization of their respective operating coils 563 and 572. The latching mechanism of the relays 562 and 570 are arranged to be released by reset coils 576 and 577, respectively. The reset coils 576 and 577 are connected in parallel, and one side of the parallel circuit is connected to the bus 411 and the other side thereof is connected to the bus 410 in series with a parallel circuit including the normally open contact 442 of the relay 428 in one leg thereof and the contact arms 496 and 506 of the limit switches 461 and 463, respectively, in the other leg thereof.

The remaining portion of the apparatus shown in Figs. 13 and 14 bearing numeral designations from 447 to 536, inclusive, is identical in construction and operation with and is connected across the busses 410 and 411 in the same manner as that described for the same apparatus shown in Figs. 7 and 8, with the exception that the contacts 496 and 506 of the limit switches 461 and 463 are arranged to energize only the reset coils 576 and 577 when the cover is moved from one coiling head to the other.

*Operation of alternate embodiment*

In the alternate embodiment of the invention, let it be assumed that the core 10 has been withdrawn from the reel 11 and threaded through the apparatus as described in the preferred embodiment of the invention and that the extruding head 23 and extruder 24 are operating to apply an insulating cover around the core to form the conductor 325, and that the end of the conductor 25 has been connected to the coiling head 80. When the cover 87 is positioned to enclose the coiling head 80, the switches 461 and 463 are actuated thereby so that the contact arms assume the position shown in Fig. 14, in which the contact arm 506 bridges the contacts 507—507 and connects the coil 475 across the busses 410 and 411 in series with the normally closed contact 517 of the relay 437 and the contacts of the push button 518 which have been actuated to their closed position. The coil 475 is energized and closes its contacts 536—536 which connect the motor 382 across the terminals 533—533 whereupon the motor 382 drives the coiling head 80 to coil up the conductor 25. The contact arm 510 of the switch 463 bridges the contacts 512—512 whereby the coil 522 of the relay 523 is connected across the busses 410 and 411 in series with the normally closed contact 524 of the relay 525 provided on the timer 526 and the contacts of the push button 518. Energization of the coil 522 closes the contacts 532—532 which in turn, connect the motor 371 arranged to drive the capstan 70 to the supply terminals 533—533. Thus, the movement of the cover 87 to enclose the coiling head 80 results in the simultaneous energization of the motors 371 and 382, which cooperate to advance and coil up the conductor 25, respectively.

The relay 465 (Fig. 13) is energized by virtue of the fact that its operating coil is connected across the busses 410 and 411 through the normally closed contact of the push button 466 and the normally closed contact 467 provided in the switch 407 mounted on the cutover tower 18 and arranged to be actuated by the clamp 400. Energization of the relay 465 closes the contact 470 which together with the closure of the contact 472 upon energization of the coil 475, energizes the relay 478, which closes the contact 483 and thereby energize the auto transformer 481. The auto transformer 481 in turn energizes the stepup transformer 485 whereupon a high potential is impressed across the testing circuit including the secondary winding 490 and the electrodes 55 and 67. Since the metallic core of the conductor 25 is grounded at 192, the insulating covering on the portion of the conductor 25 passing through the electrodes 55 and 67 is subjected to a potential having an intensity sufficient to break down any faults therein providing paths of reduced dielectric strength.

When the capstan 370 and the coiling head 80 are placed in operation, the movable pulley 20 of the cutover tower 18 is in its lowermost position, and the movable pulley 44 carried by the bracket 45 is positioned at the extreme left-hand limit of the track due to the fact that the tension in the conductor 25 is sufficient to overcome the tension of the spring drum 50. The counter 547, mounted on the housing 372, is driven by the motor 371 in the manner described in the preferred embodiment of the invention and continuously records the footage of the filamentary conductor being coiled up by the coiling head 80. The coiling head 80 continues to coil up the conductor 25 and the counter 547 continuously records the footage being coiled up.

The counter 547 including the cams 550 and 552 is arranged to automatically control the coiling heads 80 and 84 so that they alternately coil up a predetermined footage of the conductor 25, unless a fault or splice should occur in the insulation of the conductor, in which case, the coiling head in operation is caused to coil up an additional footage of the conductor 25 so that when the fault or splice is removed from the coil, there will result two coils both of which will contain at least the required minimum footage allowed per coil. As stated in the preferred embodiment of the invention, it is desirable to normally produce coils on the coiling heads 80 and 84 which contain 800 feet of good conductor and that no coils should contain less than 200 feet or more than 1000 feet of good conductor.

The cams 550 and 552 provided on the counter 548, perform their respective functions to obtain these results in the following manner: Assuming that the coiling head 80 has been placed in operation as described, when it has coiled up 200 feet of the conductor 25, the hundredths wheel 390 has advanced the cam 550 so that the first recess 551 passes under the roller 393 and permits momentary closure of the contact 415 of the switch 396. The first closure of the contact 415 does not cause energization of the coil 572 because the contact 566 on the timer 567 is arranged to remain open until after 200 feet of the conductor is coiled up. The timer motor 580 is energized as long as the busses 410 and 411 are energized and the single pole double throw switch 546 is in the position shown in Fig. 13, but the timing period of the energization of the motor and the closure of its contact 566 is adjusted so to allow the coiling head 80 to coil up at least 200 feet of the conductor before the contact 566 is closed. If the conductor is being coiled up at the rate of 300 feet per minute, the timer 567 is adjusted to close the contact 566 one minute after the timer motor 580 is energized or approximately one minute after the start of each coiling head. The motor 580 stalls after it closes the contact 566 and holds the contact closed until the timer motor circuit is interrupted by the operation of the switch 546 by movement of the knife 373.

When the coiling head 80 has coiled up exactly 600 feet of the conductor, the digit "6" of the hundredths wheel appears opposite the window in the counter 547, which movement of the counterwheel 390 advances the cam 550 in a counter-clockwise direction so that the recess 551 which is positioned between the digits "2" and "3" on the hundredths wheel 390, passes under the roller 393 and allows a second momentary closure of the normally open contact 415 of the switch 396 (Fig. 13). Since the timer 567 closed the contact 566 when 300 feet of the conductor was coiled up, the momentary closure of the contact 415 connects the coil 572 of the relay 570 across the busses 410 and 411 which energizes the coil 572 and closes the normally open contact 569. The normally open contact 569 is latched in its closed position and connects the motor 568 of the timer 565 across the busses 410 and 411 which motor rotates a cam to close the normally open contact 564 of the timer after a predetermined period of time. The timer motor holds the contact 564 in a closed position until the motor is disconnected from the busses 410 and 411. The closure of the contact 564 connects the coil 563 of the relay 562 across the busses 410 and 411 in series with the normally open contact 415 of the switch 396 mounted in the counter 547. Thus, when the coiling head 80 has coiled up 600 feet of the conductor 25, the counter effects the operation of the relay 570 and the timer 565 to set up a circuit which depends upon a subsequent closure of the contact 415 in order to cause the solenoid 374 to actuate the knife 373 to sever the conductor 25 and terminate the coiling operation.

When exactly 800 feet of the conductor 25 has been coiled up on the coiling head 80, the hundredths wheel 390 advances the cam so that the recess 551 positioned between the digits "4" and "5" of the hundredths wheel 390 allows the arm 394 to move downwardly and momentarily close the normally open contact 415 of the switch 396. The momentary closure of the contact 415 completes the circuit connecting the coil 563 across the busses 410 and 411, whereupon the coil is energized and actuates the normally open contact 561 to its closed position, which contact is latched closed by the spring-loaded latching mechanism of the relay. Closure of the contact 561 simultaneously energizes the coil 436 of the relay 437 and the solenoid 560 which is arranged to actuate the reset lever 558 of the counter 547. The solenoid 560 immediately actuates the reset lever and resets the counting wheels of the counter to their normal starting position so that they will be in position to record the footage of the conductor coiled up by the next succeeding coiling operation.

The energization of the coil 436 of the relay 437 opens its normally closed contact 482 which immediately deenergizes the high voltage testing circuit connected to the electrodes 55 and 67 and closes the contact 445 which connects the solenoid 374 across the busses 410 and 411. Energization of the solenoid 374 actuates the knife blade 373 which severs the conductor 25. At the same time that the contact 445 is closed to energize the solenoid 374 which severs the conductor 25, the contact 517 provided on the relay 437 opens and disconnects the coil 475 from the busses 410 and 411 which deenergizes the coil and permits contacts 536—536 to open and disconnect the motor 382 from the terminals 533. The deenergization of the motor 382 brings the coiling head 80 to rest but the capstan 70, driven by the motor 371, continues to operate because the normally closed contact 524 of the timer 526 has not been opened. However, the contact 527 is closed simultaneously with the contact 445 upon the energization of the relay 437, and energizes the motor 530, which after a predetermined period of time, closes the cam operated switch 528, which in turn connects the coil 531 of the relay 525 across the busses 410 and 411. Energization of the coil 531 opens the normally closed contact 524 and deenergizes the coil 522, whereupon the contacts 532—532 drop open and disconnect the motor 371 from the terminals 533—533.

The delay between the deenergization of the motor 382 and the motor 371 is provided so that after the solenoid 374 is energized to sever the conductor, the capstan 70 is driven by the motor 371 until a sufficient length of conductor 25 is advanced through the tube 76 in order that it may be connected to the empty coiling head 84. As soon as the knife severs the conductor 25, it thereafter actuates the contact 575 of the switch 546 to disconnect the motor 568 of the timer 567 from the busses and connect the reset coil 458 of the relay 448 across the busses. This arrangement provides for the resetting of the counter, the severing of the conductor by the solenoid 374 and the resetting of the relay 448 in rapid succession so that this apparatus is restored to its normal starting position and ready to control the next succeeding coiling operation.

When the capstan 370 comes to a complete stop upon expiration of the timing period determined by the timer 526, the end of the conductor 25 at the coiling head 80 is not being advanced, in which case, the spring drum 50 urges the pulley 44 to the right hand limit of its travel on the T-rail 48. This movement of the pulley 44 forms a substantial reverse loop in the path of travel of the conductor 25 from the capstan 40 to the capstan 370. The leading end of the severed conductor 25 is connected to the empty coiling head 84 and the cover 87 is moved from its extreme left hand position to its extreme right hand position to enclose the coiling head 84. This movement of the cover 87 actuates the limit switches 463 and 461 in the order stated, so that the contact arms 506 and 510 disengage their respective contacts 507—507 and 512—512, whereas the contact arms 496 and 500 assume their broken line positions and engage their respective contacts 497—497 and 502—502.

As the cover 87 passed through the mid position between the coiling heads 80 and 84, the contact arm 506 is moved into engagement with the contacts 462—462 while the contact arm 496 engages the contacts 460—460. This arrangement of the switches 461 and 463 connects the reset coils 576 and 577 of the relays 562 and 570, respectively, across the busses 410 and 411, whereupon they actuate their respective latching mechanisms to release the contacts 561 and 569 to their normally open positions. The opening of the contact 561 deenergizes the coil 436, whereupon its associated contacts assume their deenergized positions, and the opening of the contact 569 deenergizes the motor 568 of the timer 565 and allows the contact 564 to reset to its normally open position. The deenergization of the solenoid 374 allows the contact 546 to return to its normal position and energize the motor of the timer 567, in which case, the timer begins its timing cycle slightly ahead of the energization of the motors 371 and 385 to start the coiling operation because the solenoid 374 is deenergized as the cover 87 passes through its mid position.

When the cover 87 reaches its right hand limit of travel, the contact 496 of the switch 461 now connects one terminal of the coil 473 directly to the bus 410. The normally closed contact 517, which reclosed upon the deenergization of the relay 437 connects the other terminal of the coil 473 to the bus 411 through the closed contacts of the push button 518. The movement of the cover therefore energizes the coil 473 which closes the contacts 535—535 and connects the motor 385 to the terminals 583—583, whereupon the motor 385 is energized and drives the coiling head 84 which coils up the conductor 25. The arm 510 of the switch now connects the coil 522 across the busses, whereupon the coil closes the contacts 532—532 to connect the motor to the terminals 533—533. Thus, the cover 87 actuates the switches 461 and 463 so as to provide simultaneous energization of the motors 371 and 385 and rotation of the capstan 70 and the coiling head 84, respectively. As the coiling head takes up the conductor 25 it creates sufficient tension in the conductor 25 between the coiling head 84 and the capstan 40 to move the sheave 44 to the left end of the rail 48 against the action of the spring drum 50. The step-up transformer 485 is energized upon closure of the relay 474 and applies a high potential to the electrodes 55 and 67 so that the insulating cover of the conductor 25 being coiled up by the coiling head 84 is subjected to the high potential test.

As soon as the coiling head 84 is placed in operation by the movement of the cover 87, the completed coil is removed from the coiling head 80 so that the coiling head will be ready to coil up the conductor 25 when the coiling head 84 has taken up 800 feet of conductor. When the coiling head 84 has taken up 800 feet of the conductor 25, that is, when the counter 547 registers 800 feet, the electrical apparatus shown in Figs. 13 and 14 operates in the above-described manner to sever the conductor 25, reset the counter 547 to its starting position and terminate the coil in process. The coiling heads 80 and 84 will alternately coil up 800 foot coils of the conductor 25 in the manner described above so long as the insulating cover of the conductor does not contain any faults or splices which would cause the insulating cover to break down as it passes through the electrodes 55 and 67 and cause a current to flow in the high potential testing circuit sufficient to energize the coil 492 of the fault indicating relay 428.

In order to maintain continuous operation of the apparatus including the coiling heads 80 and 84, the handle 401 is actuated to clamp the core 10 to the pulley so that the trailing end of the core 10 being withdrawn from the reel 11 may be spliced to the leading end of the core on the supply reel 98. This splicing operation is performed in the same manner as that described for the preferred embodiment of the invention. The splices, as mentioned hereinabove, are a metallic connector designed to connect the ends of the cores together and are designed to pass through the extruding head 23 with the core and receive an insulating cover the same as is the core. The splices may not be used in the field and therefore must be removed from the coils after they are wound on the coiling heads. The splices, in passing through the electrodes, provide paths of reduced dielectric strength which break down under the potential applied to the electrodes 55 and 67, whereupon sufficient current flows in the testing circuit to energize the coil 491 of the relay 428. In addition to such splices, other defects may be present in the insulation which would produce the same result in passing through the electrodes, in which case such splices or defects will hereinafter be referred to as faults which must be removed from the coils.

The electrical apparatus shown in Figs. 13 and 14 is arranged to control the coiling heads in conjunction with the testing electrodes to prevent the termination of a coiling operation when such faults occur within less than 200 feet from the end of a normal 800 foot coil being coiled up by the coiling head in operation. For example, when 600 feet of the conductor 25 has been coiled up, the contact 415 is closed momentarily to energize the coil 572 and close the contact 569 which in turn, energizes the timer 565. The contact 564 of the timer 565 is arranged to be closed after the expiration of several seconds and set up a circuit for the operating coil 563 of the relay 562 so that the next succeeding closure of the contact 415, which occurs when 800 feet have been coiled up, connects the coil 563 across the busses, which coil is thereby energized and causes the cutter solenoid 374 to operate the knife 373 and sever the conductor 25. However, should a fault or splice in the insulation of the conductor pass through the electrode 67 after 600 feet of the conductor 25 has been coiled up, the operation of the fault detecting relay 428, due to the presence of a fault in the electrodes, energizes the reset coil 577 and allows the contact 569 of the relay 570 to drop open, which in turn, deenergizes the timer 565 allowing its contact 564 to open. Thus, the passage of a fault through the electrodes after 600 feet has been coiled up, restores the electrical apparatus to its original state so that the subsequent closure of the contact 415 when the coiling head 80 has coiled up 800 feet of conductor does not cause the solenoid 374 to operate the knife, in which case the conductor 25 is not severed.

The closure of the contact 415 when 800 feet has been taken up again energizes the coil 572 and the timer motor 568 so as to place the circuit of the coil 563 in such a condition that the next succeeding closure of the contact 415 will effect the operation of the knife 373 which severs the conductor 25. Therefore, due to the particular design of the cam 550, 1000 feet of the conductor 25 has been coiled up by the particular coiling head in operation when the contact 415 closes and causes the conductor to be severed and the termination of the coiling operation. The coil on the coiling head contains 1000 feet of the conductor 25, which coil contains a fault therein which passed through the electrode 67 some time after 600 feet had been coiled up. When such a coil is rewound for the purpose of removing the fault, two coils will result when the fault is cut out, each of which will contain more than 200 feet of good conductor.

It is possible that several faults may be present in the insulation of the conductor being coiled up, in which case, it is necessary to delay the termination of the coil with respect to the last fault which passes through the electrodes.

It has been shown hereinabove, that when a fault passes through the electrodes after 600 feet of the conductor has been coiled up, the operation of the fault indicating relay 428 prevents the coil from being terminated when 800 feet of the conductor has been coiled up on the coiling head and allows the coiling head to continue to operate until an additional 200 feet of the conductor has been coiled up, or a total of 1000 feet of conductor before the conductor is severed and the coil in process terminated. Let it be assumed, that in addition to the fault which occurred after 600 feet had been coiled up, that a second fault passes through the electrode 67 after 800 feet of the conductor had been coiled up by the particular coiling head in operation. The second fault causes the coil 491 of the fault detecting relay 428 to be energized and thereby energizes the reset coil 577 which releases the contacts 564 and 569 to their normally open positions. Since the contact 564 is open, the closure of the contact 415 of the switch 396 by the cam 550 when the coiling head has coiled up 1000 feet of the conductor can not affect the operation of the relays 562 and 437 necessary to energize the solenoid 374 and actuates the knife 373 to sever the conductor. The momentary closure of the contact 415 at this point merely reenergizes the relay 570 which closes its contact 569 and thereby energizes the motor 568 of the timer 565, which motor, after a predetermined period of time closes the contact 564. The cam 552 is designed so that when 1000 feet of the conductor has been coiled up, the recess 553 allows the contact 571 to close and remain closed after the momentary closure of the contact 415. When 1000 feet of the conductor 25 has been coiled up, the cam 550 has been advanced one revolution and again assumes the position shown in Figs. 11 and 13. The coiling head in operation continues to coil up the conductor 25 until 200 additional feet of the conductor 25 is coiled up or a total of 1200 feet at which point the first recess 551 of the cam 550 allows the arm 394 to close the contact 415 of the switch 396. When the contact 415 closes under these conditions, the coil 563 is connected across the busses 410 and 411 in series with the contacts 571, 415 and the contact 566 held closed by the motor 580 of the timer 567. The energization of the coil 563 closes its contact 561 which causes the solenoid 560 to reset the counter to its normal starting position and the solenoid 374 to sever the conductor 25. Regardless of whether any subsequent faults pass through the electrodes the closure of the contacts 415 and 571 terminates the coil at the 1200 foot point, which is the maximum footage that can be taken up by the coiling heads. If two faults are present in the coil and occur in the order set forth hereinabove, such a coil when rewound in order that the faults may be removed from the coil produces three coils, all of which contain at least 200 feet of good conductor.

Each time the cutter solenoid 374 is energized and actuates the knife 373 it also actuates the contact 578 and to reset the relay 443 to its normal starting position and deenergize the motor of the timer 567, whereupon its contact 566 resumes its normally open position. Each time the relay 437 is energized it deenergizes the particular motor driving the coiling head in operation and also effects the delayed deenergization of the motor 371, driving the capstan 370 in the manner described above.

It is seen from the operation of the alternate embodiment of the invention, that the coiling apparatus is controlled in the preferred manner by employing electrical apparatus to take the place of the step selector relay disclosed in the preferred embodiment of the invention. While the above-described embodiment of the invention is adapted to control coiling apparatus so as to produce coils containing 800 feet of conductor under normal condtions and coils containing at least 200 feet of good conductor when the conductor contains a fault, the apparatus may be readily modified to produce coils of any given length without departing from the spirit and scope of the invention.

What is claimed is:

1. The method of coiling filamentary materials into predetermined lengths, which comprises continuously advancing a filamentary material from a supply thereof along a predetermined path of travel, passing the advancing material through means positioned along said path of travel for detecting defects in the advancing material, coiling the material at the end of its path of travel, and intermittently terminating the coiling operation into coils each having a predetermined length of the material if a defect is not detected within a given portion of said predetermined length of the material or coiling an additional predetermined length of material on the coil in process if a defect is detected in the material within said predetermined portion of the predetermined length.

2. The method of coiling filamentary materials into predetermined lengths, which comprises continuously advancing a filamentary material from a supply thereof along a predetermined path of travel, passing the advancing material through means positioned along said path of travel for detecting defects in the material, and intermittently terminating the coiling operation into coils each having a predetermined length of the material if the material is not defective within a given portion of said predetermined length or coiling an additional predetermined minimum length of material required per coil on the coil in process containing said predetermined length of material if the material coiled up is defective within said portion of the predetermined length of material.

3. The method of coiling filamentary materials into predetermined lengths, which comprises advancing a filamentary material from a supply thereof along a predetermined path of travel, coiling up the filamentary material at the end of its path of travel, connecting the trailing end of the filamentary material when the supply thereof is exhausted at the beginning of said path of travel to an end of a like filamentary material from another supply thereof, passing the advancing material through means positioned along said path of travel adapted to detect the connection between the filamentary materials, and intermittently terminating the coiling operation into coils each having a predetermined length of the material if a connection is not detected with a predetermined portion of the said predetermined length of material coiled up or if the material coiled up contains a defect within said predetermined portion thereof continuing to coil the material upon said coil of predetermined length until an additional predetermined length of continuous material is coiled thereon.

4. The method of coiling filamentary materials into predetermined lengths, which comprises advancing a filamentary material from a supply thereof along a predetermined path of travel, coiling up the filamentary material at the end of its path of travel, connecting the trailing end of the filamentary material when said supply thereof is exhausted at the beginning of said path of travel to an end of a like filamentary material from another supply thereof, passing the advancing material through means positioned along said path of travel adapted to detect the connection between the filamentary materials, and intermittently terminating the coiling up of the material each time a predetermined length of material is coiled-up if a connection is not detected within a predetermined portion of the said predetermined length of material or continuing to coil the material on said coil of predetermined length until a length of material equal to a minimum footage of material required per coil is coiled thereon if the predetermined length of material coiled up contains a connection within said predetermined portion thereof.

5. The method of coiling filamentary materials into predetermined lengths, which comprises advancing a filamentary material from a supply thereof along a predetermined path of travel, intermittently coiling up the filamentary material at the end of its path of travel into coils having a predetermined length of the material, connecting the trailing end from an exhausted supply at the beginning of its path of travel to an end of a like material from another supply, and terminating the coil in process containing the connection between the materials when said predetermined length of material is coiled up if said connection lies within a predetermined portion of the coil or coiling an additional predetermined length of material on said coil containing the connection after said predetermined length is coiled up if the connection lies outside said predetermined portion of said coil.

6. The method of coiling filamentary materials into predetermined lengths, which comprises advancing a filamentary material from a supply thereof along a predetermined path of travel, intermittently coiling up the filamentary material at the end of its path of travel into coils having a predetermined length of the material, connecting the trailing end from an exhausted supply at the beginning of its path of travel to an end of a like material from another supply, and terminating the coil in process containing a connection between the materials when said predetermined length of material is coiled up if said connection lies within a predetermined portion of the coil or coiling an additional predetermined length of material equal to the minimum length of material required per coil containing the connection after said predetermined length is coiled up if the connection lies outside the said predetermined portion of the coil when the said predetermined length is coiled thereon.

7. The method of coiling filamentary materials into predetermined lengths, which comprises continuously advancing a filamentary material from a supply thereof along a predetermined path of travel, intermittently coiling up the advancing material at the end of said path of travel into coils each having a predetermined length of material, connecting the trailing end of the material when said supply thereof is exhausted at the beginning of said path of travel to an end of a like material from another supply to maintain a continuous supply of material to be coiled up, passing the advancing material through means adapted to detect the connection between the materials a predetermined distance from the end of said path of travel, passing the advancing material through a second means adapted to detect the said connection substantially at the end of said path of travel, and terminating the coil in process containing the connection when said predetermined length is coiled thereon if said connection passed through the first-mentioned detecting means before a predetermined portion of the said predetermined length of material was coiled up or coiling an additional predetermined length of material on said coil in process after the said predetermined length is coiled thereon if said connection therein passed through the first detecting means after a predetermined portion of said predetermined length of material was coiled up.

8. The method of coiling filamentary material into predetermined lengths, which comprises continuously advancing a filamentary material from a supply thereof along a predetermined path of travel, intermittently coiling up the advancing material at the end of said path of travel into coils each having a predetermined length of the material, connecting the trailing end of the material when said supply thereof is exhausted to an end of a like material from another supply to maintain a continuous supply of material to be coiled up, passing the advancing material through means adapted to detect the connection between the materials at a point positioned a predetermined distance from the end of said path of travel, passing the advancing material through a second means adapted to detect the said connection substantially at the end of said path of travel, and terminating the coil in process containing the connection when said predetermined length is coiled thereon if said connection passed through the first-mentioned detecting means before a predetermined portion of the said predetermined length of material was coiled on said coil or coiling an additional length of material on said coil equal to the length of material positioned between the said detecting means if said connection therein passed through said first detecting means after a predetermined portion of said predetermined length of material was coiled on the coil in process.

9. The method of coiling filamentary materials into predetermined lengths, which comprises continuously advancing a filamentary material from a supply thereof along a predetermined path of travel, intermittently coiling up the advancing material at the end of said path of travel into coils each having a predetermined length of material, connecting the trailing end of the material when said supply thereof is exhausted to an end of a like material from another supply to maintain a continuous supply of material to be coiled up, passing the advancing material through means adapted to detect the connection between the materials a predetermined distance from the end of said path of travel, passing the advancing material through a second means adapted to detect the said connection substantially at the end of said path of travel, said detecting means being spaced apart along said path of travel a distance equal to the minimum length of material required per coil, and terminating the coil in process containing the connection when said predetermined length is coiled thereon if said connection passed through the first-mentioned detecting means before a predetermined portion of the said predetermined length of material was coiled up or coiling an additional length of material required per coil if said connection passed through said first detecting means after a predetermined portion of said predetermined length of material was coiled on the coil in process.

10. The method of coiling a filamentary conductor having a metallic core surrounded by an insulating cover into predetermined lengths, which comprises advancing the insulated conductor from the supply reel along a predetermined path of travel, passing the conductor through an electrode arranged to engage the insulating cover and thereby apply across the insulating cover and the core of the conductor a potential having an intensity sufficient to detect any faults in the insulation which provide paths of reduced dielectric strength between the electrode and the metallic core of the conductor, passing the conductor through a cutting device positioned adjacent to the end of its path of travel, coiling up the conductor as it emerges from the cutting device, continuously measuring the number of feet of conductor being coiled up, actuating the cutting device to terminate the coiling operation each time a predetermined length of the filamentary conductor is coiled up, rendering the cutting device inoperative when said predetermined length of the conductor has been coiled up if the electrode detected a fault in the insulation of the conductor within a predetermined portion of the said predetermined length of conductor, and causing the cutting device to terminate the coil in process when an additional predetermined length of the conductor has been coiled up on the coil containing the fault.

11. The method of coiling a filamentary conductor having a metallic core surrounded by an insulating cover into predetermined lengths, which comprises advancing the conductor from a supply reel along a predetermined path of travel, connecting the trailing end of a conductor from an exhausted supply reel to the leading end of a conductor wound on a second supply reel so as to maintain a continuous supply of the conductor along its path of travel, causing the advancing conductor to pass through an electrode arranged to engage the insulating cover and thereby apply across the insulating cover of the conductor a potential having an intensity sufficient to break down the insulation thereof at any connections or other faults therein which provide paths of reduced dielectric strength therein, passing the conductor through a cutting device positioned at a point adjacent to the end of its path of travel, coiling up the conductor as it emerges from the cutting device, measuring the number of feet of conductor being coiled up, normally actuating the cutting device to sever the conductor each time a predetermined footage of the filamentary conductor has been coiled up, rendering the cutting device inoperative if the electrode detected a connection between the conductors or other fault in the insulation of the conductor within a predetermined distance from the end of a normal coil to be coiled up, and causing the cutting device to operate when an additional predetermined footage of the insulated conductor has been added to the normal coil.

12. The method of coiling an insulating filamentary conductor having a metallic core surrounded by an insulating cover into predetermined lengths, which comprises continuously advancing a conductor from a supply reel along a predetermined path of travel, passing the conductor through a cutting device adjacent to the end of its path of travel, coiling up the conductor at the end of its path of travel, continuously measuring the footage of the conductor being coiled up, normally actuating the cutting device each time a predetermined footage of the filamentary conductor has been coiled up, clamping the trailing end of the conductor when it leaves an exhausted supply reel at the beginning of its path of travel so that it may be connected to the leading end of a like conductor provided on another supply reel so as to form a reverse loop in the path of travel in the conductor prior to clamping the trailing end of the conductor against further movement so that the conductor may be coiled up while the connection is being made, releasing the end of the conductor when the connection is completed so that the conductor is withdrawn from the last-mentioned supply reel to maintain a continuous supply of the conductor to be coiled up, rendering the cutting device inoperative if a connection or fault in the insulation of the conductor engages the electrode within a predetermined distance from the start of a coil of said predetermined length, causing the cutting device to sever the conductor when an additional predetermined footage of the conductor has been added to the coil containing said connection or fault, and alternately connecting the conductor from one supply reel to the other to maintain a continuous supply of conductor to the coiling means.

13. An apparatus for coiling filamentary materials into predetermined lengths, which comprises means for continuously advancing a filamentary material from a supply thereof along the predetermined path of travel, means positioned along the said path of travel of the material for detecting defects in the material, means for coiling up the filamentary material at the end of its path of travel, and means for selectively terminating the coiling operation into coils each having a predetermined length of the material if the material is not defective within a given portion of said predetermined length or continuing to coil an additional predetermined length of the material on the coil having said predetermined length of material coiled up if the material is defective within said portion of the predetermined length.

14. An apparatus for coiling filamentary articles into predetermined lengths, which comprises means for continuously advancing a filamentary material from a supply thereof along a predetermined path of travel, means positioned along the path of travel of the material for detecting defects in the advancing material, means for coiling up the material at the end of its path of travel, and means for selectively terminating the coiling operation into coils each having a predetermined length of the material if the material is not defective within a predetermined portion of said predetermined length or coiling an additional predetermined minimum length of the material required per coil on the coil containing said predetermined length of the material if the material coiled up is defective within said predetermined portion of the predetermined length of the material.

15. An apparatus for coiling filamentary materials into predetermined lengths, means for continuously advancing a filamentary material from a supply thereof along a predetermined path of travel, means for coiling up the filamentary material at the end of its path of travel, means for clamping the trailing end of the filamentary material when said supply thereof is exhausted at the beginning of its path of travel to an end of another like filamentary material taken from another supply thereof, means positioned along the said path of travel of the material adapted to detect the connection between the filamentary article, and means for selectively terminating the coiling operation into coils each having a predetermined length of the material if a connection is not detected within a predetermined portion of said predetermined length of the material coiled up or continuing to coil up a predetermined length until an additional predetermined length of continuous material on the coil in process if said predetermined length of material coiled up contains a defect with the said predetermined portion.

16. An apparatus for coiling filamentary materials into predetermined lengths, which comprises means for continuously advancing the filamentary material from a supply thereof along a predetermined path of travel, means for coiling up the filamentary material at the end of its path of travel, means for clamping the trailing end of the filamentary material when the said supply thereof is exhausted at the beginning of said path of travel to an end of like filamentary material from another supply thereof, means positioned along said path of travel of the advancing material adapted to detect the connection between the filamentary material, and means for selectively terminating the coiling operation into coils each having a predetermined length of the material if a connection is not detected within a predetermined portion of the said predetermined length of material coiled up or continuing to coil the material upon the coil of predetermined length until an additional predetermined length of continuous material equal to a minimum footage of material required per coil is coiled thereon if said length of material coiled up contains a defect within the said predetermined portion.

17. An apparatus for coiling filamentary material into predetermined lengths, which comprises means for continuously advancing a filamentary material from a supply thereof along a predetermined path of travel, means for intermittently coiling up the filamentary material at the end of its path of travel into coils having a predetermined length of the material, means for clamping the trailing end of the filamentary material when the supply thereof is exhausted at the beginning of its path of travel so that it may be connected to an end of a like material from another supply, and means for selectively terminating the coil in process containing the connection between the filamentary material when said predetermined length of material is coiled up if said connection lies within a predetermined portion of the coil or continuing to coil up the material on the coil containing the connection after said predetermined length is coiled up until an additional predetermined length of material is coiled thereon if the connection lies outside said predetermined portion of the coil.

18. An apparatus for coiling filamentary material into predetermined lengths, which comprises means for continuously advancing a filamentary material from a supply thereof along a predetermined path of travel, means for intermittently coiling up the filamentary material at the end of its path of travel into coils having a predetermined length of the material, means for clamping the trailing end of the filamentary material when the supply thereof is exhausted at the beginning of its path of travel so that it may be connected to an end of a like material from another supply, and means for selectively terminating the coil in process containing the connection between the filamentary material when said predetermined length of material is coiled up if said connection lies within a predetermined portion of the coil or continuing to coil up the material on the coil containing the connection after said predetermined length is coiled up until an additional predetermined length of material equal to the minimum length of material required per coil is coiled thereon if the connection lies outside said predetermined portion of a coil containing said predetermined length of material.

19. An apparatus for coiling filamentary materials into predetermined lengths, which comprises means for continuously advancing a filamentary material from a supply thereof along a predetermined path of travel, means for intermittently coiling up the advancing material at the end of said path of travel into coils each having a predetermined length of material, means for clamping the trailing end of the material when said supply thereof is exhausted at the beginning of its path of travel so that it may be connected to an end of a like filamentary material from another supply thereof to maintain a continuous supply of material to be coiled up, means adapted to engage the advancing material for detecting the connection between the materials at a point positioned a predetermined distance from the end of said path of travel, a second means adapted to detect the said connection substantially at the end of said path of travel, and means for selectively terminating the coiling process containing the connection when said predetermined length is coiled thereon if said connection passed through the first-mentioned detecting means before a predetermined portion of said predetermined length of material was coiled up or coiling an additional predetermined length of material on said coil after the predetermined length is coiled up if the connection therein passed through said first-mentioned detecting means after a predetermined portion of said pre-determined length of material was coiled up.

20. An apparatus for coiling filamentary materials into predetermined lengths, which comprises means for continuously advancing a filamentary material from a supply thereof along a predetermined path of travel, means for intermittently coiling up the advancing material at the end of said path of travel into coils each having a predetermined length of material, means for clamping the trailing end of the material when said supply thereof is exhausted at the beginning of its path of travel so that it may be connected to an end of a like filamentary material from another supply thereof to maintain a continous supply of material to be coiled up, means adapted to engage the advancing material for detecting the connection between the materials at a point positioned a predetermined distance from the end of said path of travel, a second means adapted to detect the said connection substantially at the end of said path of travel, and means for selectively terminating the coiling process containing the connection when said predetermined length is coiled thereon if said connection passed through the first-mentioned detecting means before a predetermined portion of said predetermined length of material was coiled up or coiling an additional length of material on said coil in process equal to the length of material positioned between said detecting means after the predetermined length is coiled up if said connection passed through the first-mentioned detecting means after a predetermined portion of said predetermined length of material was coiled up.

21. An apparatus for coiling filamentary materials into predetermined lengths, which comprises means for continuously advancing a filamentary material from a supply thereof along a predetermined path of travel, means for intermittently coiling up the advancing material at the end of said path of travel into coils each having a predetermined length of material, means for clamping the trailing end of the material when said supply thereof is exhausted at the beginning of its path of travel so that it may be connected to an end of a like filamentary material from another supply thereof to maintain a continuous supply of material to be coiled up, means adapted to engage the advancing material for detecting the connection between the materials at a point positioned a predetermined distance from the end of said path of travel, a second means adapted to detect the said connection substantially at the end of said path of travel, said detecting means being spaced apart along said path of travel a distance equal to the minimum length of material required per coil, and means for selectively terminating the coiling process containing the connection when said predetermined length is coiled thereon if said connection passed through the first-mentioned detecting means before a predetermined portion of said predetermined length of material was coiled up or coiling an additional length of material on said coil of a predetermined length equal to the minimum length of material required per coil if said connection continued in the coiling process passed through the first-mentioned detecting means after a predetermined portion of said predetermined length of material was coiled up on the coil containing the connection.

22. An apparatus for coiling a filamentary conductor having a metallic core surrounded by an insulated cover into predetermined lengths, which comprises means for advancing the insulated conductor from a supply reel along a predetermined path of travel, means engaged by the advancing conductor for applying across the insulating cover and the metallic core of the conductor a potential having an intensity sufficient to break down any faults therein which provide paths of reduced dielectric strength between the electrode and the core, means provided adjacent to the advancing means for coiling up the conductor at the end of its path of travel, means positioned adjacent to the coiling means for cutting the conductor, means driven by the advancing means for measuring the footage of the conductor being coiled up by the coiling means, electrically-operated means arranged to be energized by the said measuring means for actuating the cutting device and terminate the coil in process each time a predetermined footage of the conductor has been coiled up by the coiling means, electrically-operated means arranged to be energized when a fault breakdown occurs in the insulation of the conductor after a predetermined portion of the said predetermined footage has been coiled up to render the cutting means inoperative when said predetermined footage of a filamentary conductor is coiled up, and means associated with said measuring means for rendering the cutter actuating means operative when an additional predetermined footage of the conductor has been added to the faulty coil.

23. An apparatus for coiling a filamentary conductor having a metallic core surrounded by an insulating cover into predetermined lengths, which comprises means for advancing a filamentary insulated conductor from a supply reel along a predetermined path of travel, a plurality of electrodes spacedly positioned along the path of travel of the advancing conductor and adapted to apply across the insulating cover and the metallic core of the conductor a potential having an intensity sufficient to break down any faults therein providing paths of reduced dielectric strength between the electrodes and the metallic core, rotatable means provided adjacent to the advancing means for coiling up the conductor at the end of its path of travel, means for clamping the trailing end of the conductor at the beginning of said path of travel when the supply thereof is exhausted so that said trailing end may be connected to the leading end of a like conductor from another supply reel to maintain a continuous supply of the material to the coiling means, means associated with the clamping means for deenergizing the electrodes while the connection is made between the conductors, electrically-operated means positioned between the coiling means for cutting the advancing conductor, means driven by the advancing means for continuously measuring the footage of the conductor being coiled up by the coiling means, and means controlled by the measuring means for automatically energizing the electrically-operated cutting device to terminate the coil in process each time a predetermined footage of the conductor is coiled up by the coiling means, and means associated with said measuring means for rendering the cutter actuating means operative when an additional predetermined footage of the conductor has been added to the faulty coil.

24. An apparatus for coiling a filamentary conductor having a metallic core surrounded by an insulating cover into predetermined lengths, which comprises means for advancing a filamentary insulated conductor from a supply reel along the predetermined path of travel, a pair of electrodes spacedly positioned substantially at the end of said path of travel and adapted to engage the insulating cover of the advancing conductor, said electrodes being connected to an electric circuit energizable to apply across the insulating covering and the core of the conductor a potential having an intensity sufficient to break down any faults therein providing paths of reduced dielectric strength between the electrodes and the core, means positioned adjacent to the advancing means for severing the conductor, means positioned adjacent to the severing means for coiling up the conductor at the end of its path of travel, means driven by the advancing means for measuring the footage of the conductor being coiled up by the coiling means, electrically-operated means energizable to actuate the conductor severing means, means provided on the measuring means for energizing the electrically-operated means to actuate the severing device and terminate the coil in process each time a predetermined footage of the conductor is coiled up, means actuated simultaneously with the cutting device for terminating the coiling operation, a second electrically-operated means arranged to be energized a predetermined period of time after the conductor is severed to stop the conductor advancing means so that the leading end of the severed conductor may be connected to a second coiling means positioned adjacent to the first-mentioned coiling means, means for forming a loop in the path of travel of the conductor between the supply thereof and the cutting device adapted to be expanded and take up the advancing conductor while the advancing means is stopped, mean energizable upon the passage of a fault in insulation of the conductor through the electrodes for rendering the severing means inoperative when said predetermined footage is coiled up if a fault in the conductor passes through the electrodes after a predetermined portion of said predetermined footage was coiled up, and means controlled by said footage measuring means for causing the severing means to sever the conductor and terminate the coil in process when an additional predetermined footage of the conductor is coiled on the faulty coil.

25. An apparatus for coiling a filamentary conductor having a metallic core surrounded by an insulating cover into predetermined lengths, which comprises a capstan for advancing the filamentary conductor along the predetermined path of travel, an electric motor arranged to rotate the capstan at a constant speed, a pair of electrodes spacedly positioned along said path of travel and adapted to slidably engage the insulating cover of the advancing conductor, said electrodes being connected in a circuit energizable to apply across the insulating cover and the core of the conductor a potential having an intensity sufficient to detect any faults in the insulation providing paths of reduced dielectric strength between the electrodes and the core, said electrodes being spaced to form a 200 foot loop of conductor therebetween and one of said electrodes engages the conductor substantially at the end of its path of travel, a coiling head positioned adjacent to the advancing means for coiling up the conductor at the end of its path of travel, electrically-operated means including a cutting device positioned adjacent to the coiling head for severing the conductor, a counter driven by the advancing means for continuously measuring the footage of the conductor being coiled up by the coiling head, a cam positioned on the counter so as to rotate with the hundredths wheel thereof, a normally open switch positioned in the counter for controlling the energization of the electrically-operated cutting device said cam being arranged to close the switch momentarily each time 200 feet of the conductor is coiled up and cause the conductor to be severed each time 800 feet of the conductor is coiled up on the coiling head, means energizable upon the passage of a fault through the electrodes for rendering the cutting device inoperative when 800 feet of conductor is coiled up if a fault passes through the last electrode of the said pair of electrodes after 600 feet of the conductor is coiled up, whereby the coiling head continues to coil up an additional 200 feet of the conductor on the 800 foot coil at which time the cam on the hundredths wheel closes the switch in the counter and causes the conductor to be severed into a 1000 foot coil.

WENTWORTH D. BOYNTON.

No references cited.